(12) United States Patent
Yang et al.

(10) Patent No.: US 12,469,551 B2
(45) Date of Patent: Nov. 11, 2025

(54) INPUT/OUTPUT REFERENCE VOLTAGE TRAINING METHOD IN THREE-DIMENSIONAL MEMORY DEVICES

(71) Applicant: YANGTZE MEMORY TECHNOLOGIES CO., LTD., Hubei (CN)

(72) Inventors: Shiyang Yang, Hubei (CN); Chunfei Deng, Hubei (CN); Yan Lu, Hubei (CN); Ling Ding, Hubei (CN); Xiang Fu, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 265 days.

(21) Appl. No.: 17/929,450

(22) Filed: Sep. 2, 2022

(65) Prior Publication Data

US 2024/0079054 A1 Mar. 7, 2024

(51) Int. Cl.
*G11C 11/50* (2006.01)
*G11C 5/04* (2006.01)
*G11C 11/56* (2006.01)

(52) U.S. Cl.
CPC ............ *G11C 11/5628* (2013.01); *G11C 5/04* (2013.01)

(58) Field of Classification Search
CPC ....... G11C 11/5628; G11C 5/04; G11C 5/147; G11C 7/1096; G11C 16/30; G11C 16/32; G11C 16/10; G11C 16/26; G11C 16/0483; G11C 16/24; H10B 43/27; G06F 3/0658
See application file for complete search history.

(56) References Cited

U.S. PATENT DOCUMENTS

| | | | |
|---|---|---|---|
| 9,514,794 B2 | 12/2016 | Ozawa et al. | |
| 9,558,806 B1 | 1/2017 | Suwa et al. | |
| 9,929,644 B2 | 3/2018 | Kim et al. | |
| 2012/0063244 A1* | 3/2012 | Kwon | H02M 3/073 365/189.07 |
| 2015/0121018 A1 | 4/2015 | Lee | |
| 2016/0197611 A1 | 7/2016 | Kang et al. | |

(Continued)

FOREIGN PATENT DOCUMENTS

| | | |
|---|---|---|
| CN | 114822634 A | 7/2022 |
| JP | 2016-197275 A | 11/2016 |

(Continued)

OTHER PUBLICATIONS

Yangtze Memory Technologies Co., Ltd., European Search Report mailed Jan. 13, 2025, EP App. No. 24198892.2, 10 p.

(Continued)

*Primary Examiner* — Uyen Smet
(74) *Attorney, Agent, or Firm* — Conley Rose, P.C.

(57) ABSTRACT

Methods for input/output voltage training of a three-dimensional (3D) memory device is disclosed. The method can comprise the following operations: (1) setting a reference voltage value at an on-die termination (ODT) enabled status; (2) controlling the 3D memory device to perform a write training process; (3) determining whether a further write training process is needed; (4) in response to determining that the further write training process is needed, repeating operations (1), (2) and (3); and (5) in response to determining that the further write training process is not needed, setting the reference voltage value as an optimized reference voltage value.

16 Claims, 15 Drawing Sheets

(56) References Cited

U.S. PATENT DOCUMENTS

| | | | |
|---|---|---|---|
| 2017/0287535 A1* | 10/2017 | Lee | G11C 7/1084 |
| 2018/0061472 A1* | 3/2018 | Hyun | G11C 5/06 |
| 2018/0315461 A1 | 11/2018 | Lee et al. | |
| 2019/0158109 A1* | 5/2019 | Kavala | H03M 1/785 |
| 2019/0164594 A1 | 5/2019 | Eom et al. | |
| 2020/0202905 A1 | 6/2020 | Hong et al. | |
| 2020/0372941 A1 | 11/2020 | Park et al. | |
| 2021/0151084 A1 | 5/2021 | Kim | |
| 2022/0148631 A1 | 5/2022 | Lee et al. | |

FOREIGN PATENT DOCUMENTS

| | | |
|---|---|---|
| JP | 2017-027535 A | 2/2017 |
| KR | 20070116363 A | 12/2007 |
| KR | 20150047290 A | 5/2015 |
| KR | 20160083669 A | 7/2016 |
| WO | WO 2022/062467 A1 | 3/2022 |

OTHER PUBLICATIONS

Yangtz Memory Technologies Co., Ltg., "Japanese Office Action dated Apr. 30, 2025," Japanese Patent App. No. 2024-059407, 4 p., (translation 4 p.).

* cited by examiner

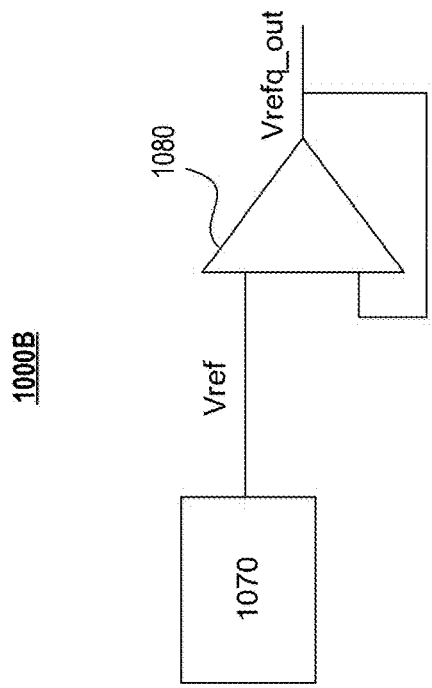
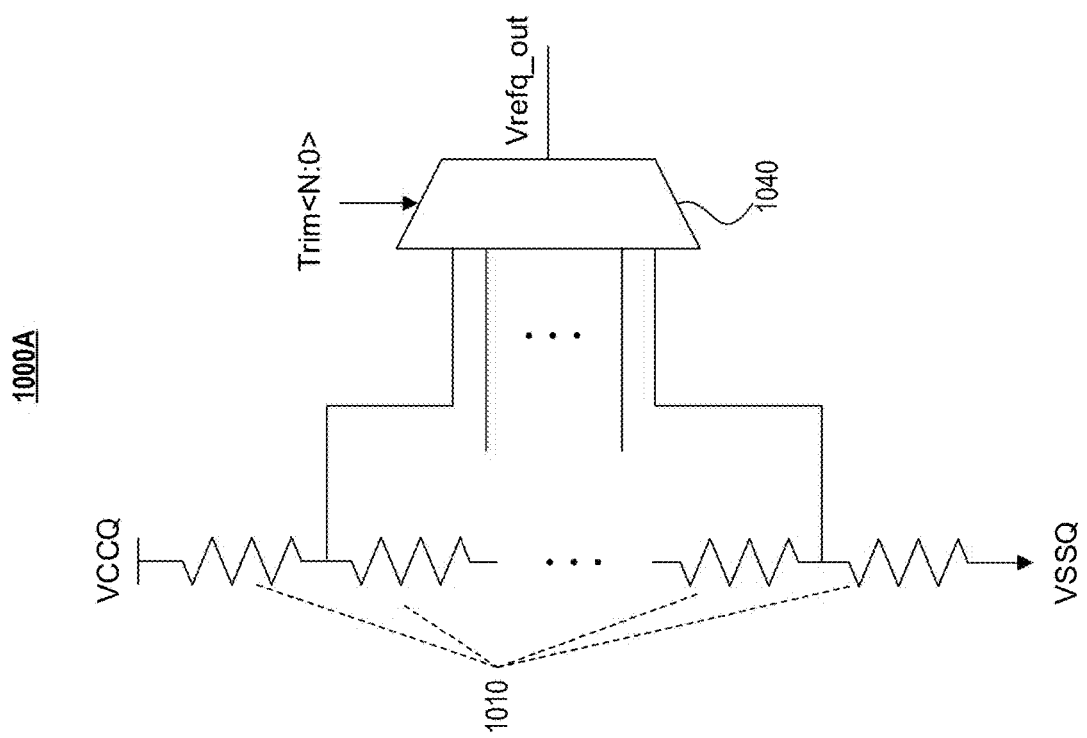
FIG. 10B
FIG. 10A

INPUT/OUTPUT REFERENCE VOLTAGE TRAINING METHOD IN THREE-DIMENSIONAL MEMORY DEVICES

TECHNICAL FIELD

The present disclosure generally relates to the field of semiconductor technology, and more particularly, to a method for input/output voltage training for a three-dimensional (3D) memory, a related system and related media.

BACKGROUND

As memory devices are shrinking to smaller die size to reduce manufacturing cost and increase storage density, scaling of planar memory cells faces challenges due to process technology limitations and reliability issues. A three-dimensional (3D) memory architecture, such as a 3D NAND flash memory device, can address the density and performance limitation in planar memory cells. To improve accuracy in signals communicated between 3D NAND flash memory device and a host (e.g., a processor device) or other integrated circuit (IC) device, many conventional techniques are available for calibration of circuitry (e.g., receivers and transmitters) in these devices. The initialization procedure of a 3D NAND flash memory device can include four phases: power-up and initialization, ZQ calibration, Vref DQ Calibration, and read/write training.

BRIEF SUMMARY

Aspects of a three-dimensional (3D) memory device and methods for input/output voltage training are described in the present disclosure.

One aspect of the present disclosure provides a method for input/output voltage training of a three-dimensional (3D) memory device. The method can comprise the following operations: (1) setting a reference voltage value at an on-die termination (ODT) enabled status; (2) controlling the 3D memory device to perform a write training process; (3) determining whether a further write training process is needed; (4) in response to determining that the further write training process is needed, repeating operations (1), (2) and (3); and (5) in response to determining that the further write training process is not needed, setting the reference voltage value as an optimized reference voltage value.

In some embodiments, setting the reference voltage value is performed no matter at the on-die termination (ODT) enabled status or at an ODT disabled status.

In some embodiments, setting the reference voltage value comprises controlling a main voltage source, by using a first trimming signal, to generate a reference voltage generation signal.

In some embodiments, setting the reference voltage value further comprises controlling a voltage booster, by using a second trimming signal and a booster enable control signal, to generate a reference voltage boost signal.

In some embodiments, setting the reference voltage value further comprises generating the reference voltage value based at least on the reference voltage generation signal and the reference voltage boost signal.

In some embodiments, wherein setting the reference voltage value further comprises: changing a reference voltage from an older value to a default value during a first time duration of a first high level of the booster enable control signal; and changing the reference voltage from the default value to a new value for write training during a second time duration of a second high level of the booster enable control signal.

In some embodiments, setting the reference voltage value further comprises: controlling a voltage booster, by using the first trimming signal and a booster enable control signal, to generate a reference voltage boost signal; and controlling a reference voltage initiating circuit, by using the first trimming signal and an initiation enable control signal, to generate a reference voltage initiation signal.

In some embodiments, setting the reference voltage value further comprises generating the reference voltage value based at least on the reference voltage generation signal, the reference voltage boost signal, and the reference voltage initiation signal.

In some embodiments, wherein setting the reference voltage value further comprises: changing the reference voltage from an older value to a default value during a first time duration of a high level of the initiation enable control signal; and changing the reference voltage from an older value to a default value during a first time duration of a high level of the booster enable control signal.

In some embodiments, performing the write training process comprises performing a data write-in operation and a data read-out operation; and determining whether the further write training process is needed at least based on a result of the data read-out operation.

Another aspect of the present disclosure provides a three-dimensional (3D) memory device, comprising an memory cell array and a peripheral circuit coupled with the memory cell array. The peripheral circuit comprises a control circuit configured to: (1) set a reference voltage value at an on-die termination (ODT) enabled status; (2) control the memory cell array to perform a write training process; (3) determine of whether a further write training process is needed; (4) in response to determining that the further write training process is needed, repeating operations (1), (2) and (3); and (5) in response to determining that the further write training process is not needed, setting the reference voltage value as an optimized reference voltage value.

In some embodiments, the logic control circuit is further configured to set the reference voltage value no matter at the on-die termination (ODT) enabled status or at an ODT disabled status.

In some embodiments, the peripheral circuit further comprises a main voltage source configured to receive a first trimming signal from the logic control circuit and to generate a reference voltage generation signal.

In some embodiments, the peripheral circuit further comprises a voltage booster configured to receive a second trimming signal and a booster enable control signal from the logic control circuit to generate a reference voltage boost signal.

In some embodiments, the peripheral circuit further comprises a multiplexer configured to generate the reference voltage value based at least on the reference voltage generation signal and the booster enable control signal.

In some embodiments, the multiplexer is configured to: change a reference voltage from an older value to a default value during a first time duration of a first high level of the booster enable control signal; and change the reference voltage from the default value to a new value for write training during a second time duration of a second high level of the booster enable control signal.

In some embodiments, the peripheral circuit further comprises: a voltage booster configured to receive the first trimming signal and a booster enable control signal from the logic control circuit to generate a booster enable control signal; and a reference voltage initiating circuit configured to receive the first trimming signal and an initiation enable control signal from the logic control circuit to generate a reference voltage initiation signal.

In some embodiments, the peripheral circuit further comprises a multiplexer configured to generate the reference voltage value based at least on the reference voltage generation signal, the booster enable control signal, and the reference voltage initiation signal.

In some embodiments, the multiplexer is further configured to: change the reference voltage from an older value to a default value during a first time duration of a high level of the initiation enable control signal; and change the reference voltage from an older value to a default value during a first time duration of a high level of the booster enable control signal.

In some embodiments, the control circuit is further configured to: control the memory cell array to perform a data write-in operation and a data read-out operation; and determine whether the further write training process is needed at least based on a result of the data read-out operation.

Another aspect of the present disclosure provides a memory system, comprising a 3D memory device described above, and a memory controller configure to control the 3D memory device.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 10A illustrates a schematic circuit diagram of an exemplary resistor divider, in accordance with some aspects of the present disclosure.

FIG. 10B illustrates a schematic circuit diagram of an exemplary combination of a reference voltage generator and an analog buffer, in accordance with some aspects of the present disclosure.

Figure 1A:
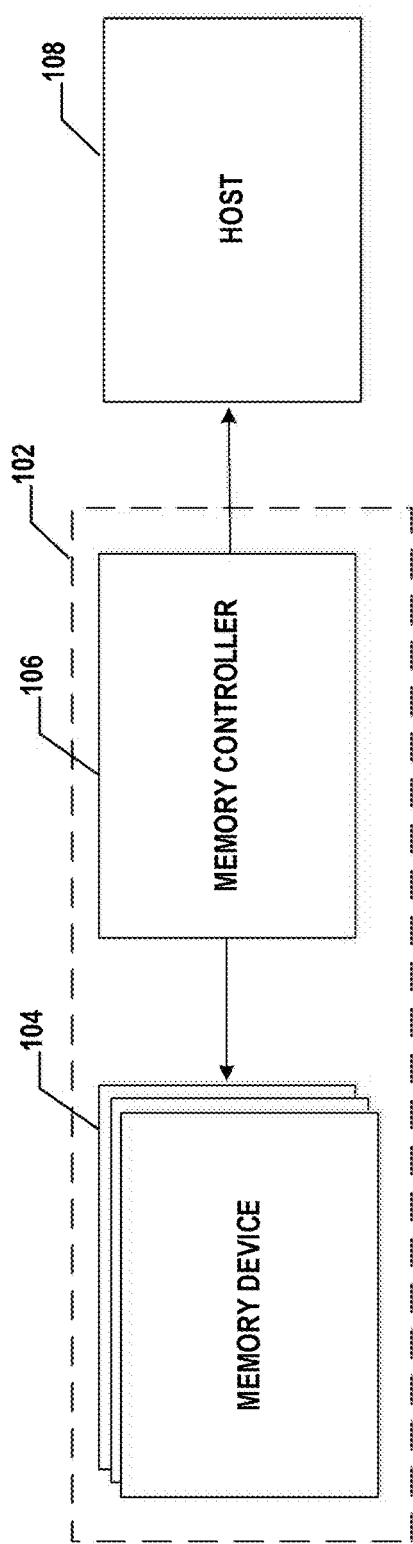
FIG. 1A illustrates a block diagram of an exemplary system having a memory device, in accordance with some aspects of the present disclosure.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

Aspects of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one aspect," "an aspect," "an example aspect," "some aspects," etc., indicate that the aspect described can include a particular feature, structure, or characteristic, but every aspect can not necessarily include the particular feature, structure, or characteristic. Moreover, such phrases do not necessarily refer to the same aspect. Further, when a particular feature, structure or characteristic is described in connection with an aspect, it would be within the knowledge of a person skilled in the pertinent art to affect such feature, structure or characteristic in connection with other aspects whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may instead, allow for existence of additional factors not necessarily expressly described, again, depending at least in part on context.

It should be readily understood that the meaning of "on," "above," and "over" in the present disclosure should be interpreted in the broadest manner such that "on" not only means "directly on" something, but also includes the meaning of "on" something with an intermediate feature or a layer therebetween. Moreover, "above" or "over" not only means "above" or "over" something, but can also include the meaning it is "above" or "over" something with no intermediate feature or layer therebetween (i.e., directly on something).

Further, spatially relative terms, such as "beneath," "below," "lower," "above," "upper," and the like, can be used herein for ease of description to describe one element or feature's relationship to another element(s) or feature(s) as illustrated in the figures. The spatially relative terms are intended to encompass different orientations of the device in use or process step in addition to the orientation depicted in the figures. The apparatus can be otherwise oriented (rotated 90 degrees or at other orientations) and the spatially relative descriptors used herein can likewise be interpreted accordingly.

As used herein, the term "substrate" refers to a material onto which subsequent material layers are added. The substrate includes a "top" surface and a "bottom" surface. The front surface of the substrate is typically where a semiconductor device is formed, and therefore the semiconductor device is formed at a top side of the substrate unless stated otherwise. The bottom surface is opposite to the front surface and therefore a bottom side of the substrate is opposite to the top side of the substrate. The substrate itself can be patterned. Materials added on top of the substrate can be patterned or can remain unpatterned. Furthermore, the substrate can include a wide array of semiconductor materials, such as silicon, germanium, gallium arsenide, indium phosphide, etc. Alternatively, the substrate can be made from an electrically non-conductive material, such as a glass, a plastic, or a sapphire wafer.

As used herein, the term "layer" refers to a material portion including a region with a thickness. A layer has a top side and a bottom side where the bottom side of the layer is relatively close to the substrate and the top side is relatively away from the substrate. A layer can extend over the entirety of an underlying or overlying structure, or can have an extent less than the extent of an underlying or overlying structure. Further, a layer can be a region of a homogeneous or inhomogeneous continuous structure that has a thickness less than the thickness of the continuous structure. For example, a layer can be located between any set of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, thereabove, and/or therebelow. A layer can include multiple layers. For example, an interconnect layer can include one or more conductive and contact layers (in which contacts, interconnect lines, and/or vertical interconnect accesses (VIAs) are formed) and one or more dielectric layers.

In the present disclosure, for ease of description, "tier" is used to refer to elements of substantially the same height along the vertical direction. For example, a word line and the underlying gate dielectric layer can be referred to as "a tier," a word line and the underlying insulating layer can together be referred to as "a tier," word lines of substantially the same height can be referred to as "a tier of word lines" or similar, and so on.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

In the present disclosure, the term "horizontal/horizontally/lateral/laterally" means nominally parallel to a lateral surface of a substrate, and the term "vertical" or "vertically" means nominally perpendicular to the lateral surface of a substrate.

As used herein, the term "3D memory" refers to a three-dimensional (3D) semiconductor device with vertically oriented strings of memory cell transistors (referred to herein as "memory strings," such as NAND strings) on a laterally-oriented substrate so that the memory strings extend in the vertical direction with respect to the substrate.

Open NAND Flash Interface (ONFI) standards, which is one of the interface for NAND interface include communications between NAND flash memory device and other devices (e.g., a host, such as a processor device). Techniques defined NAND memory device input/output (TO) interface (NAND interface) run maximum speed up to 800 megatransfers per second (MT/s). Future storage solutions targeted host interfaces, such as Peripheral Component Interconnect Express (PICe) Gen 3 and Gen 4 (PCIe-Gen3/4) and Universal Flash Storage version 3.0 (UFS 3.0) or beyond for NAND interface in order to have large storage capacity. In order to saturate PCIe/UFS host interfaces with a lower number of channels, a NAND IO interface speed needs to scale up much faster (e.g., up to 1600 MT/s or higher) than the IO interface speed defined by NAND Interfaces. Some recently developed NAND interfaces (e.g., the Toggle-mode NAND interface) can have an increased speed of up to 1200 MT/s.

Operating IO interfaces at a relatively high speed (e.g., up to 1600 MT/s or higher) suffers significant AC timing margin loss due to channel losses, NAND internal variations (e.g., due to process, voltage, and temperature (PVT) and internal timing mismatches) and host-side inherit losses (e.g., due to host-side DQ (data) and DQS (clock) mismatches). These factors can result in read AC timing margin loss or incorrect read data (e.g., data transferred from NAND device to the host). These losses may be much worse especially for higher multi-die stacking NAND memory device. Overcoming these losses can result in excessive power consumption. Another NAND implementation involves using an intermediate device (e.g., interface chip/repeater/retimer) between a host and NAND memory device in order accommodate a higher number of die stacks.

Running such an intermediate device at a relatively higher speed can also suffer significant AC timing margin loss that can lead to read timing margin loss or incorrect read data.

Data training features can be supported by NAND devices operating over 800 MT/s in heavily loaded systems. Digital Command Control (DCC) Training is the feature for the NAND to compensate duty cycle mismatch of RE_t/c signal. Read/Write DQ Training is the feature for the host to align DQS and DQ signals caused by un-matched DQS path. Read DQ Training is the function that outputs a 16 bit user-defined pattern on each of the DQ pins. It means a total of 16 bytes is output by the NAND device (note some vendors may provide a 32 byte pattern).

FIG. 1A illustrates a block diagram of an exemplary system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1A, system 100 can include a host 108 and a memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive the data to or from memory devices 104.

Memory device 104 can be any memory devices disclosed herein, such as a NAND Flash memory device. Consistent with the scope of the present disclosure, memory controller 106 may control the multi-pass programming on memory device 104 such that an NGS operation is enabled on all memory cells, even those passed the respective verify operations, in a non-last programming pass of the multi-pass programming. The peripheral circuits, such as the word line drivers, may apply a low voltage, e.g., ground (GND) voltage, on the DSGs of each memory string coupled to the selected word line, and may apply a low or negative voltage on the selected word line to enable an NGS operation on all memory cells coupled to the selected word line during a non-last programming pass.

Memory controller 106 is coupled to memory device 104 and host 108 and is configured to control memory device 104, according to some implementations. Memory controller 106 can manage the data stored in memory device 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment SSDs or embedded multi-media-cards (eMMCs) used as data storage for mobile devices, such as smartphones, tablets, laptop computers, etc., and enterprise storage arrays. Memory controller 106 can be configured to control operations of memory device 104, such as read, erase, and program operations. Memory controller 106 can also be configured to manage various functions with respect to the data stored or to be stored in memory device 104 including, but not limited to bad-block management, garbage collection, logical-to-physical address conversion, wear leveling, etc. In some implementations, memory controller 106 is further configured to process error correction codes (ECCs) with respect to the data read from or written to memory device 104. Any other suitable functions may be performed by memory controller 106 as well, for example, programming memory device 104. Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 1C:
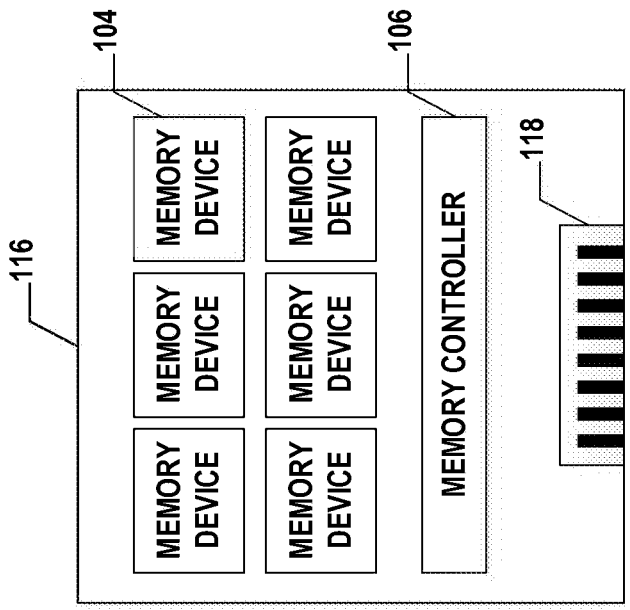
FIG. 1C illustrates a diagram of an exemplary solid-state drive (SSD) having a memory in accordance with some aspects of the present disclosure.
Figure 1B:
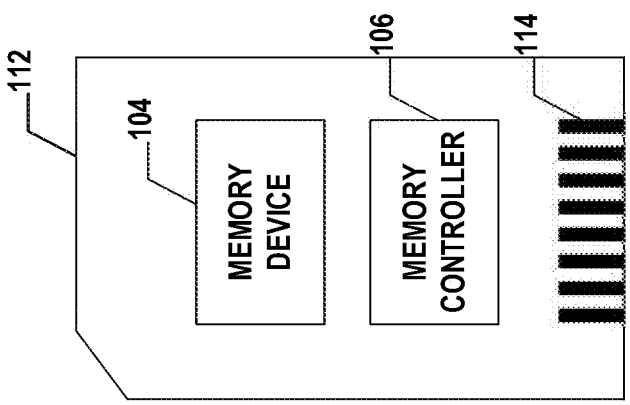
FIG. 1B illustrates a diagram of an exemplary memory card having a memory device, in accordance with some aspects of the present disclosure.

Memory controller 106 and one or more memory devices 104 can be integrated into various types of storage devices, for example, be included in the same package, such as a universal Flash storage (UFS) package or an eMMC package. That is, memory system 102 can be implemented and packaged into different types of end electronic products. In one example as shown in FIG. 1B, memory controller 106 and a single memory device 104 may be integrated into a memory card 112. Memory card 112 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 112 can further include a memory card connector 114 coupling memory card 112 with a host (e.g., host 108 in FIG. 1A). In another example as shown in FIG. 1C, memory controller 106 and multiple memory devices 104 may be integrated into an SSD 116. SSD 116 can further include an SSD connector 118 coupling SSD 116 with a host (e.g., host 108 in FIG. 1A). In some implementations, the storage capacity and/or the operation speed of SSD 116 is greater than those of memory card 112.

Figure 2:
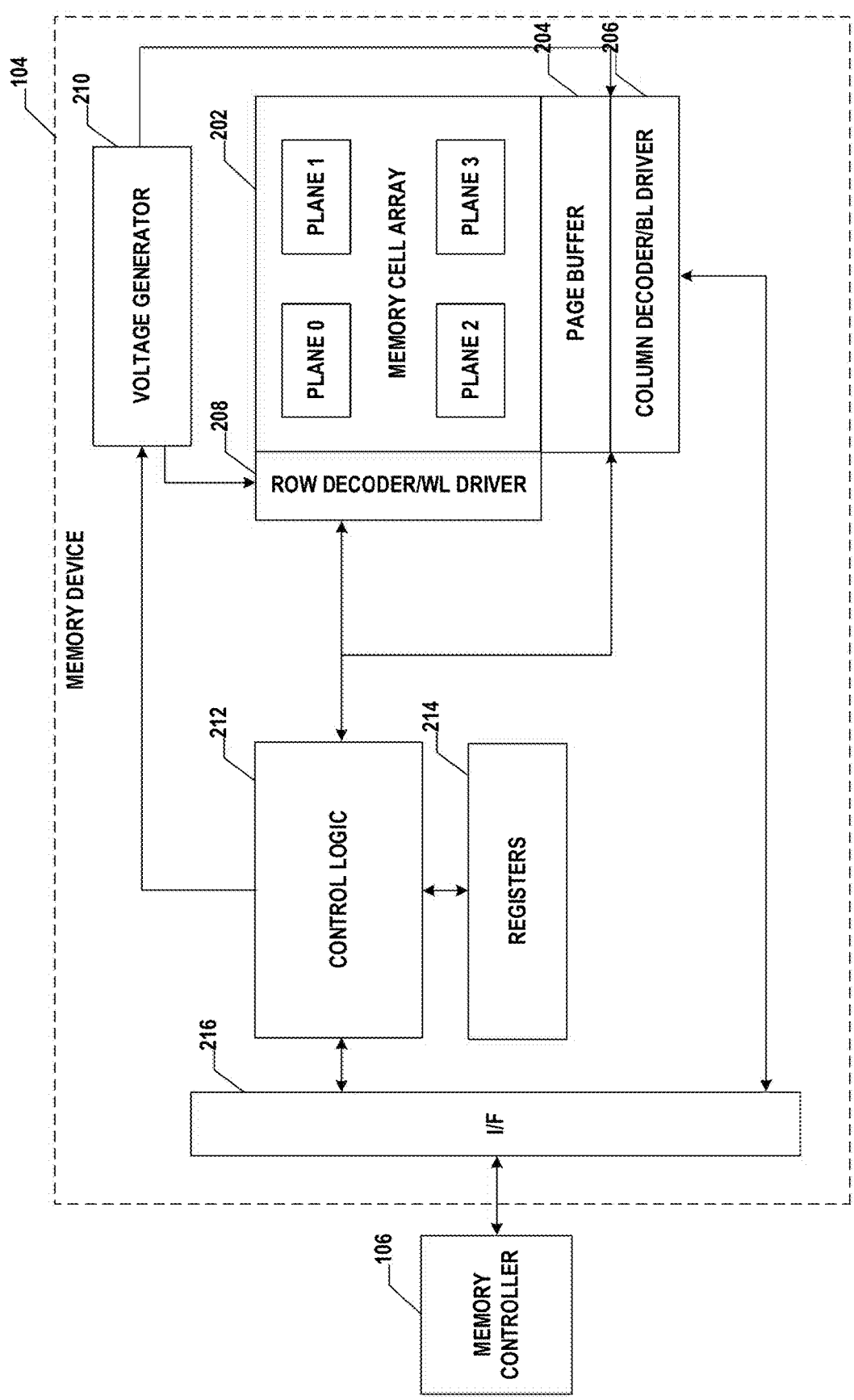
FIG. 2 illustrates a schematic block diagram of an example hardware module configuration of a memory system, in accordance with some aspects.
Figure 3:
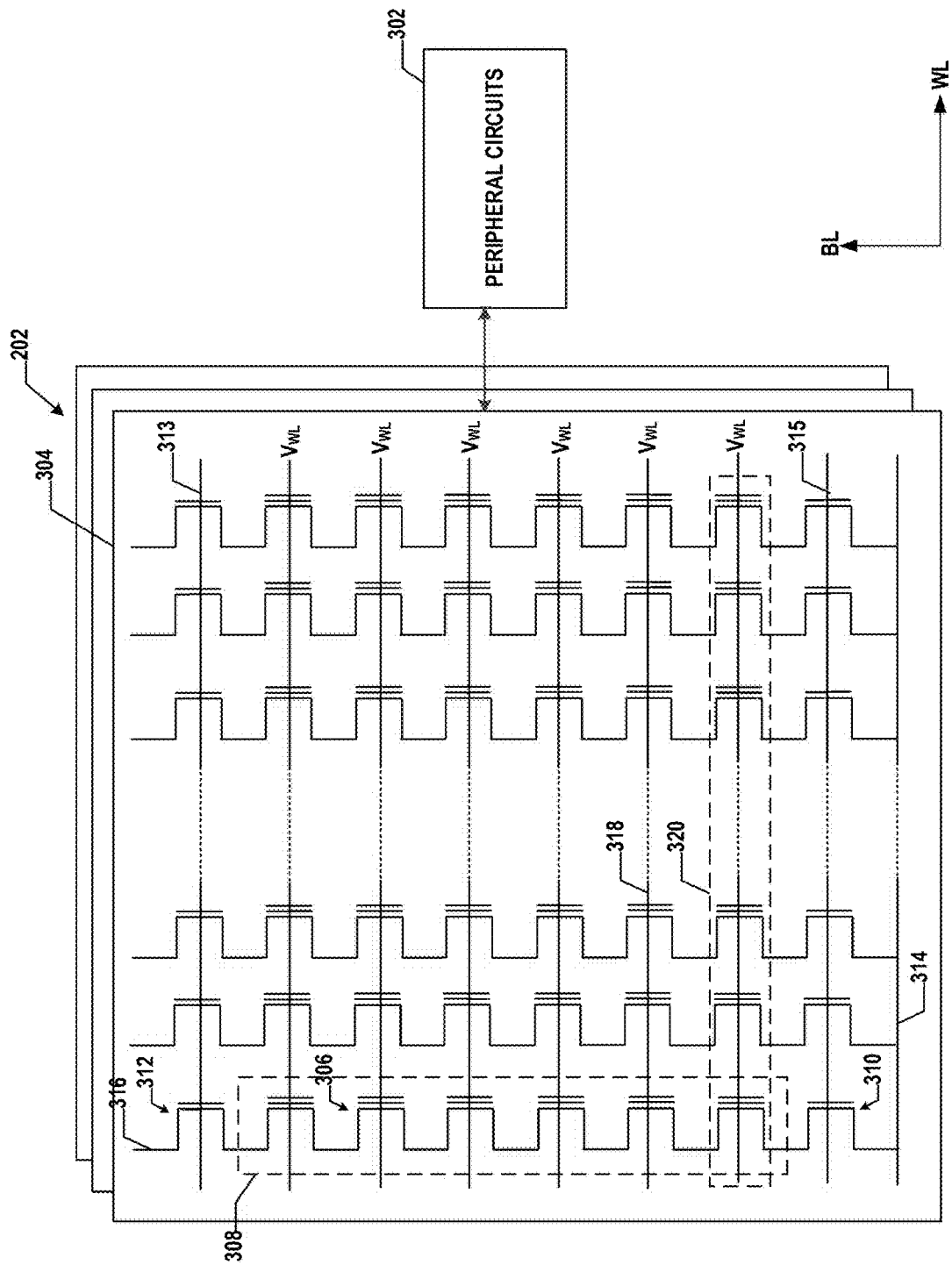
FIG. 3 illustrates a schematic circuit diagram of an exemplary memory device including peripheral circuits, according to some aspects of the present disclosure.

FIG. 2 illustrates a diagram of an exemplary memory device 104, e.g., a NAND Flash memory, having a memory cell array 202 and peripheral circuits including a page buffer 204, a column decoder/bit line driver 206, a row decoder/word line driver 208, a voltage generator 210, control logic 212, registers 214, and an interface 216. FIG. 3 illustrates a schematic circuit diagram of an exemplary memory device 104 including a memory cell array 202 and peripheral circuits 302 coupled to memory cell array 202. For ease of illustration, some components in FIGS. 2 and 3 are described together. Peripheral circuits 302 can include page buffer 204, column decoder/bit line driver 206, row decoder/word line driver 208, voltage generator 210, control logic 212, registers 214, and interface 216 in FIG. 2. It is understood that in some examples, additional peripheral circuits may be included as well.

In some aspects, the voltage generator 210 can include a plurality of charge pumps and linear regulators. In some aspects, the memory cell array can include multiple planes (i.e., plane 0, plane 1, plane 2, and plane 3). Although FIG. 2 shows four planes (plane 0, plane 1, plane 2, and plane 3), in some other aspects, a NAND die may be divided into fewer or more than four planes (e.g., 1, 2, 6, 8, etc.). A plane includes multiple memory cells which may be grouped into memory blocks. A memory block is typically the smallest erasable entity in a NAND flash die. In one example, a memory block includes a number of cells that are coupled to the same bit line. A memory block includes one or multiple pages of cells. The size of the page can vary depending on implementation. In one example, a page has a size of 16 kB. Page sizes of less or more than 16 kB are also possible (e.g., 512 B, 2 kB, 4 kB, etc.).

As shown in FIG. 3, memory cell array 202 can be a NAND Flash memory cell array in which memory cells 306 are provided in the form of an array of NAND memory strings 308 each extending vertically above a substrate (not shown). In some implementations, each NAND memory string 308 includes a plurality of memory cells 306 coupled in series and stacked vertically. Each memory cell 306 can hold a continuous, analog value, such as an electrical voltage or charge, that depends on the number of electrons trapped within a region of memory cell 306. Each memory cell 306 can be either a floating gate type of memory cell including a floating-gate transistor or a charge trap type of memory cell including a charge-trap transistor. In one example, the memory cell 306 includes a transistor with a replacement gate. A memory cell 306 with a replacement gate typically has a low resistance gate (e.g., a tungsten gate) and a charge trap layer between the gate and the channel where charge is trapped or stored to represent one or more bit values. In another example, a memory cell 306 can include a transistor with a floating gate (e.g., a high resistance poly gate) that stores charge indicative of one or more bit values. Other architectures are also possible.

In some implementations, each memory cell 306 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 306 is a multi-level cell (MLC) that is capable of storing more than a single bit of data in more than four memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 3, each NAND memory string 308 can include a source select gate (SSG) 310 at its source end and a drain select gate (DSG) 312 at its drain end. SSG 310 and DSG 312 are respective the gate electrodes of an SSG transistor and a DSG transistor and can be configured to activate selected NAND memory strings 308 (columns of the array) during read and program operations. In some implementations, SSGs 310 of NAND memory strings 308 in the same block 304 are coupled through a same source line (SL) 314, e.g., a common SL, for example, to the ground. DSG 312 of each NAND memory string 308 is coupled to a respective bit line 316 from which data can be read via an output bus (not shown), according to some implementations. In some implementations, each NAND memory string 308 is configured to be selected or deselected by applying a select voltage (e.g., above the threshold voltage of the transistor having DSG 312) or a deselect voltage (e.g., 0 V) to respective DSG 312 through one or more DSG lines 313 and/or by applying a select voltage (e.g., above the threshold voltage of the transistor having SSG 310) or a deselect voltage (e.g., 0 V) to respective SSG 310 through one or more SSG lines 315.

As shown in FIG. 3, NAND memory strings 308 can be organized into multiple blocks 304, each of which can have a common source line 314. In some implementations, each block 304 is the basic data unit for erase operations, i.e., all memory cells 306 on the same block 304 are erased at the same time. Memory cells 306 of adjacent NAND memory strings 308 can be coupled through word lines 318 that select which row of memory cells 306 is affected by read and program operations. In some implementations, each word line 318 is coupled to a page 320 of memory cells 306, which is the basic data unit for program operations. The size of one page 320 in bits can correspond to the number of NAND memory strings 308 coupled by word line 318 in one block 304. Each word line 318 can include a plurality of control gates (gate electrodes) at each memory cell 306 in respective page 320 and a gate line coupling the control gates. In some cases, dummy word lines, which contain no user data, can also be used in the memory array adjacent to the select gate transistors. Such dummy word lines can shield the edge data word line from certain edge effects.

Peripheral circuits 302 can be coupled to memory cell array 202 through bit lines 316, word lines 318, source lines 314, SSG lines 315, and DSG lines 313. Peripheral circuits 302 may apply voltages on bit lines 316, word lines 318, source lines 314, SSG lines 315, and DSG lines 313 to perform multi-pass programming including the proposed NGS scheme in a non-last programming pass. As described above, peripheral circuits 302 can include any suitable circuits for facilitating the operations of memory cell array 202 by applying and sensing voltage signals and/or current signals through bit lines 316 to and from each target memory cell 306 through word lines 318, source lines 314, SSG lines 315, and DSG lines 313. Peripheral circuits 302 can include various types of peripheral circuits formed using MOS technologies.

A programming sequence for a group of memory cells 306 can include programming of all of the intended pages into the group of memory cells 306. A programming sequence can include one or more programming passes. A programming pass (which can include one or more programming loops) can program one or more pages. A programming pass can include the application of one or more effective program voltages to cells to be programmed followed by the application of one or more verify voltages to these cells in order to determine which cells have finished programming (subsequent programming passes generally will not apply an effective program voltage and/or a verify voltage to the cells that have finished programming). The application of an effective program voltage to a cell can include changing the voltage difference between a control gate and a channel of the cell in order to change the threshold voltage of the cell. Accordingly, a voltage of a word line (coupled to the control gate of the target cell) and/or a channel of the cell can be set in order to effectuate application of an effective program voltage. As a program voltage is commonly used to refer to a voltage applied to a word line, the effective program voltage can be the voltage difference between a control gate and channel of a cell (which in instances where the channel is held at 0V can be synonymous with a program voltage).

Figure 4A:
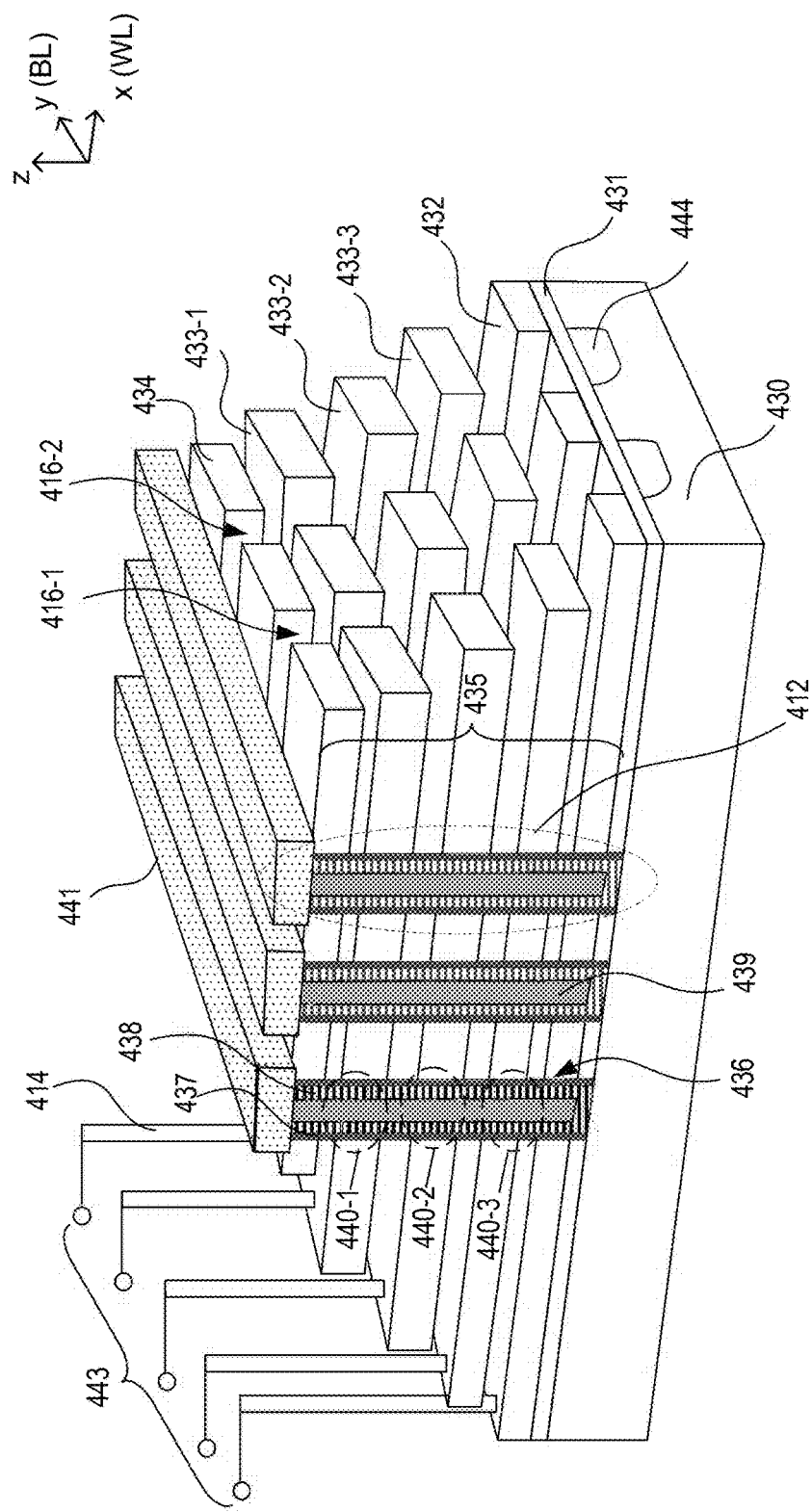
FIG. 4A illustrates a perspective view of a portion of an exemplary three-dimensional (3D) memory array structure, in accordance with some aspects of the present disclosure.

FIG. 4A illustrates a perspective view of a portion of an exemplary three-dimensional (3D) memory cell array structure 400, according to some aspects. The memory cell array structure 400 includes a substrate 430, an insulating film 431 over the substrate 430, a tier of bottom select gates (BSGs) 432 over the insulating film 431, and a plurality of tiers of control gates 433, also referred to as "word lines" (WLs) stacking on top of the BSGs 432 to form a film stack 435 of alternating conductive and dielectric layers. The dielectric layers adjacent to the tiers of control gates are not shown in FIG. 4 for clarity.

The control gates of each tier are separated by slit structures 416-1 and 416-2 through the film stack 435. The memory cell array structure 400 also includes a tier of top select gates (TSGs) 434 over the stack of control gates 433. The stack of TSGs 434, control gates 4133 and BSGs 432 is also referred to as "gate electrodes." The memory cell array structure 400 further includes memory strings 412 and doped source line regions 444 in portions of substrate 430 between adjacent BSGs 432. Each memory strings 412 includes a channel hole 436 extending through the insulating film 431 and the film stack 435 of alternating conductive and dielectric layers. Memory strings 412 also includes a memory film 437 on a sidewall of the channel hole 436, a channel layer 438 over the memory film 437, and a core filling film 439 surrounded by the channel layer 438. A memory cell 440 can be formed at the intersection of the control gate 433 and the memory string 412. A portion of the channel layer 438 underneath the control gate 433 is also referred to as the channel of the memory cell 440. The memory cell array structure 400 further includes a plurality of bit lines (BLs) 441 connected with the memory strings 412 over the TSGs 434. The memory cell array structure 400 also includes a plurality of metal interconnect lines 443 connected with the gate electrodes through a plurality of contact structures 414. The edge of the film stack 435 is configured in a shape of staircase to allow an electrical connection to each tier of the gate electrodes.

In FIG. 4A, for illustrative purposes, three tiers of control gates 433-1, 433-2, and 433-3 are shown together with one tier of TSG 434 and one tier of BSG 432. In this example, each memory string 412 can include three memory cells 440-1, 440-2 and 440-3, corresponding to the control gates 433-1, 433-2 and 433-3, respectively. The number of control gates and the number of memory cells can be more than three to increase storage capacity. The memory cell array structure 400 can also include other structures, for example, TSG cut structures, common source contacts and dummy memory strings, etc. These structures are not shown in FIG. 4A for simplicity.

Figure 4B:
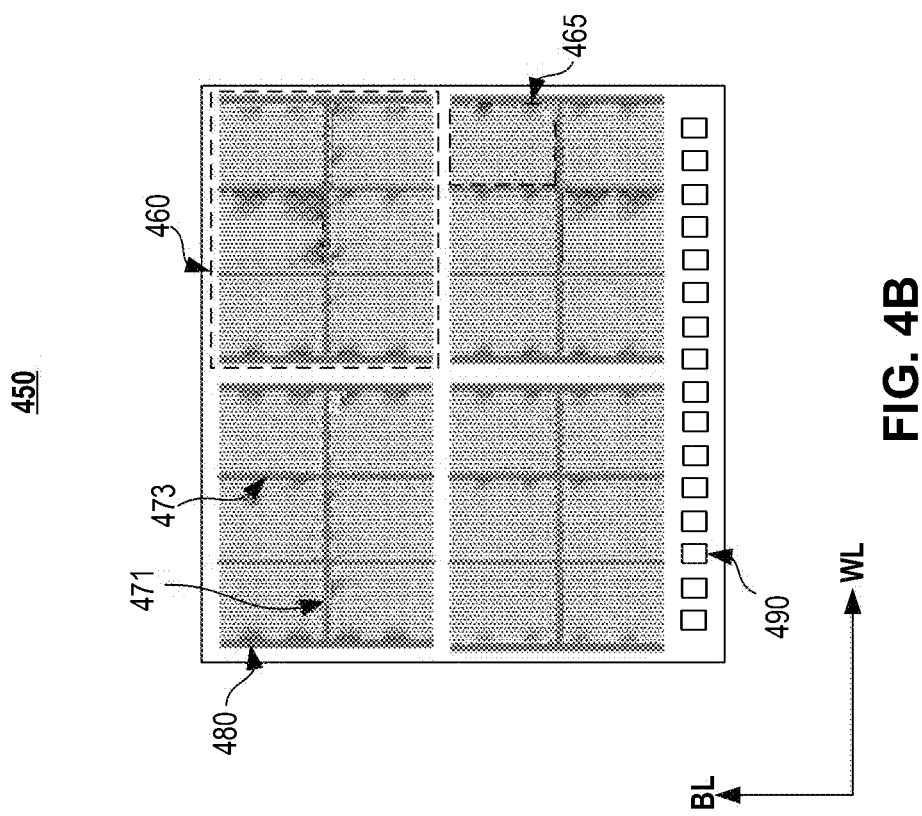
FIG. 4B illustrates a schematic diagram of an exemplary 3D memory device in a plan view, in accordance with some aspects of the present disclosure.

FIG. 4B illustrates a schematic diagram of an exemplary 3D memory device 450 in the plan view, according to some aspects of the present disclosure. 3D memory device 450 can include a plurality of channel structure regions, such as memory planes, memory blocks, memory fingers, etc., and one or more through array contact (TAC) structures can be formed between two neighboring channel structure regions. In some aspects as shown in FIG. 4B, 3D memory device 450 can include four or more memory planes 460, each of which can include a plurality of memory blocks 465. It is noted that, the arrangement of memory planes 460 in 3D memory device 450 and the arrangement of memory blocks 465 in each memory plane 460 illustrated in FIG. 4B are only used as an example, which is not limit the scope of the present disclosure.

TAC structures can include one or more bit line (BL) TAC regions 471 that are sandwiched by two neighboring memory blocks 465 in the bit line direction of the 3D memory device (labeled as "BL" in figures) and extended along the word line direction of the 3D memory device (labeled as "WL" in figures), one or more word line (BL) TAC regions 473 that are sandwiched by two neighboring memory blocks 465 in the word line direction (WL) and extended along the bit line direction (BL), and one or more staircase structure (SS) TAC regions 480 that are located at the edges of each memory plane 460.

In some aspects, 3D memory device 450 can include a plurality of contact pads 490 arranged in a line at an edge of the 3D memory device 450. Interconnect contact can be used for electrically interconnect 3D memory device 450 to any suitable device and/or interface that provide driving power, receive control signal, transmit response signal, etc.

Figure 5:
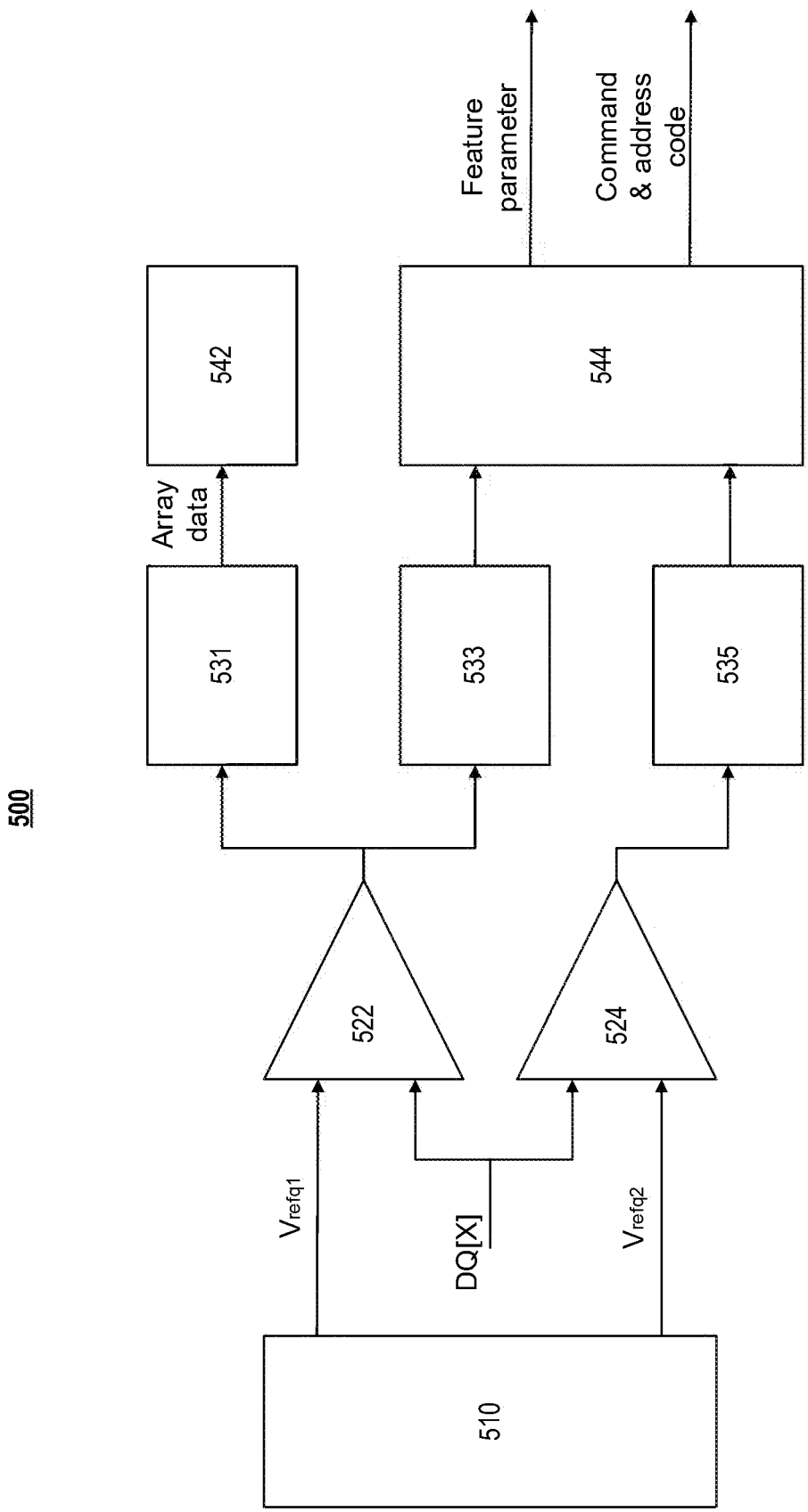
FIG. 5 illustrates a schematic block diagram of an example circuit for NAND reference voltage application, in accordance with some aspects of the present disclosure.

Referring to FIG. 5, a schematic block diagram of an example circuit for NAND reference voltage application is illustrated according to some aspects of the present disclosure. In a NAND memory device, in order to improve signal integrity at high speeds and to save IO power, the termination style of the data lines DQ[X] can be changed from Center Tapped Termination (CTT), also referred as Series-Stud Terminated Logic (SSTL), to Pseudo Open Drain (POD). In some aspects, a reference voltage Vrefq can be used to decide if the signal on data lines DQ[X] is 0 or 1. Such reference voltage Vrefq can be set using mode registers and it needs to be set correctly by the memory controller during the reference voltage DQ calibration phase.

In some aspects, NAND reference voltage DQ calibration can use two reference voltages: Vrefq1 for array data and feature parameter input, and Vrefq2 for command and address code input. As shown in FIG. 5, a reference voltage generator 510 can generate first reference voltage Vrefq1 and second reference voltage Vrefq2, and transmit the first and second reference voltages Vrefq1 and Vrefq2 into first voltage comparator 522 and second voltage comparator 524, respectively. The signal of date line DQ[X] is also inputted into first voltage comparator 522 and second voltage comparator 524, respectively.

The output of first voltage comparator 522 can be transmitted to data path pipeline 531 and parameter interface 533. The output of second voltage comparator 524 can be transmitted to command and address interface 535. The array data outputted from data path pipeline 531 can be write into memory cell array 542. The data parameter data outputted from parameter interface 533 and command and address data outputted from command and address interface 535 can be transmitted into control logic 544 to generate feature parameters and command and address code.

Figure 6:
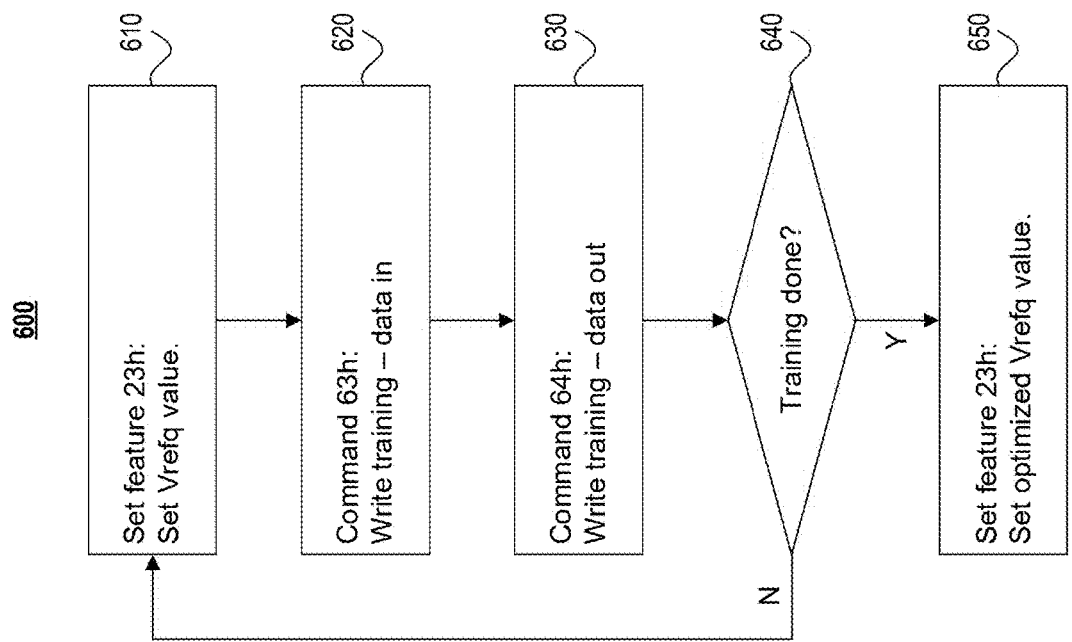
FIG. 6 illustrates a schematic flowchart of an example method 600 of IO reference voltage training of a NAND memory, in accordance with some aspects of the present disclosure.

Referring to FIG. 6, a schematic flowchart of an example method 600 of IO reference voltage training of a NAND memory device is illustrated, according to some aspects of the present disclosure. In some aspects, method 600 can adjust IO reference voltage by using a training process, and do write and read operations to verify data eye window. It is noted that, in method 600, reference voltage Vrefq can be used to represent to any one of the first reference voltage Vrefq1 and second reference voltage Vrefq2 described above. In the following example, the reference voltage Vrefq is used to represent the first reference voltage Vrefq1.

As shown in FIG. 6, method 600 can start at operation 610, in which a new reference voltage value can be set (e.g., set feature 23h). In some aspects, operation 610 can be performed without performing an on-die termination (ODT) disable operation (e.g., command 18h) before and performing an ODT enable operation (e.g., command 1h) after.

In some training methods, before setting the new reference voltage value, an operation to disable ODT feature is required in order to set the first reference voltage Vrefq1 to non-OTD case, such that the parameter data for Vrefq1 can be inputted correctly in subsequent processes. And after changing the reference voltage value, another operation to enable ODT feature is further required. In these conventional training methods, it needs additional command to set Vrefq1 to a certain level, and need to change system termination configuration from ODT on status to ODT off status. For the non-target ODT case, when a first die works on Vrefq training, a second die provided ODT for the first die, the memory and controller design can be complex.

In the present disclosed training method 600, ODT disable and enable operations before and after changing reference voltage can be omitted in the training flow. As such, not only the times for the ODT disable command operation and the ODT enable command operation can be saved, the waiting time between the ODT disable command and the set feature command, the waiting time between the set feature command and the ODT enable command, and the waiting time between the ODT enable command and a subsequent write training operation can all be saved.

As shown in FIG. 6, method 600 can proceed to operations 620 and 630, in which a data write-in operation (e.g., command 63h) and a data read-out operation (e.g., command 64h) of a write training process can be performed. It is noted that, operations 620 and 630 can be performed directly following operation 610 without executing an ODT enable command.

In some aspects, to perform the write training process at the transmitter side, the controller can issue a command 63h followed LUN address. After issuing LUN address, the host can input data pattern and confirm whether the input is successfully done by checking the output by NAND in following sequence. Data sizes for write DQ can be pre-defined by NAND. The host can recognize the data sizes by the get feature command (e.g., Feature Address=20h, B2) and can input and output the data based on the size. After writing data to the NAND with the write training—data in command (e.g., command 63h), the data can be read back with the followed write training—data out command (e.g., command 64h) by LUN address.

As shown in FIG. 6, method 600 can then proceed to operation 640, in which a determination of whether the training process is done. In some aspects, the data read back at operation 630 can be compared with "expected" data to see if further training is needed. If the data read back at operation 630 substantially match the "expected" data, it can be determine that further training is not needed. In some aspects, if fewer data than pre-defined data bytes are written, then unwritten registers will have un-defined data when read back. If over pre-defined data bytes read were executed, the data are also un-defined and invalid. When the determination of operation 640 is negative ("N" at 640), method 600 can go back to operation 610 to start another training loop.

When the determination of operation 640 is positive ("Y" at 640), method 600 can proceed to operation 650, in which the new reference voltage value can be set as the optimized reference voltage value (e.g., set feature 23h). After multiple loops of changing reference voltage value and write training, the controller can confirm optimal reference voltage level, and configure through set feature parameter.

Accordingly, method 600 can run algorithms to align clock and data strobe at the NAND memory device, can run algorithms and figure out the correct read and write delays to the NAND memory device, can center the data eye for reads, and can report errors if the signal integrity is bad and data cannot be written or read reliably.

It should be noted that the above operations of the flow diagram of FIG. 6 can be executed or performed in any order or sequence not limited to the order and sequence shown and described in the figures. Also, some of the operations of the flow diagram of FIG. 6 can be executed or performed substantially simultaneously where appropriate or in parallel to reduce latency and processing times. Furthermore, it should be noted that FIG. 6 is provided as an example only. At least one of the operations shown in FIG. 6 can be performed in a different order than represented, performed concurrently, or altogether omitted.

Figure 7:
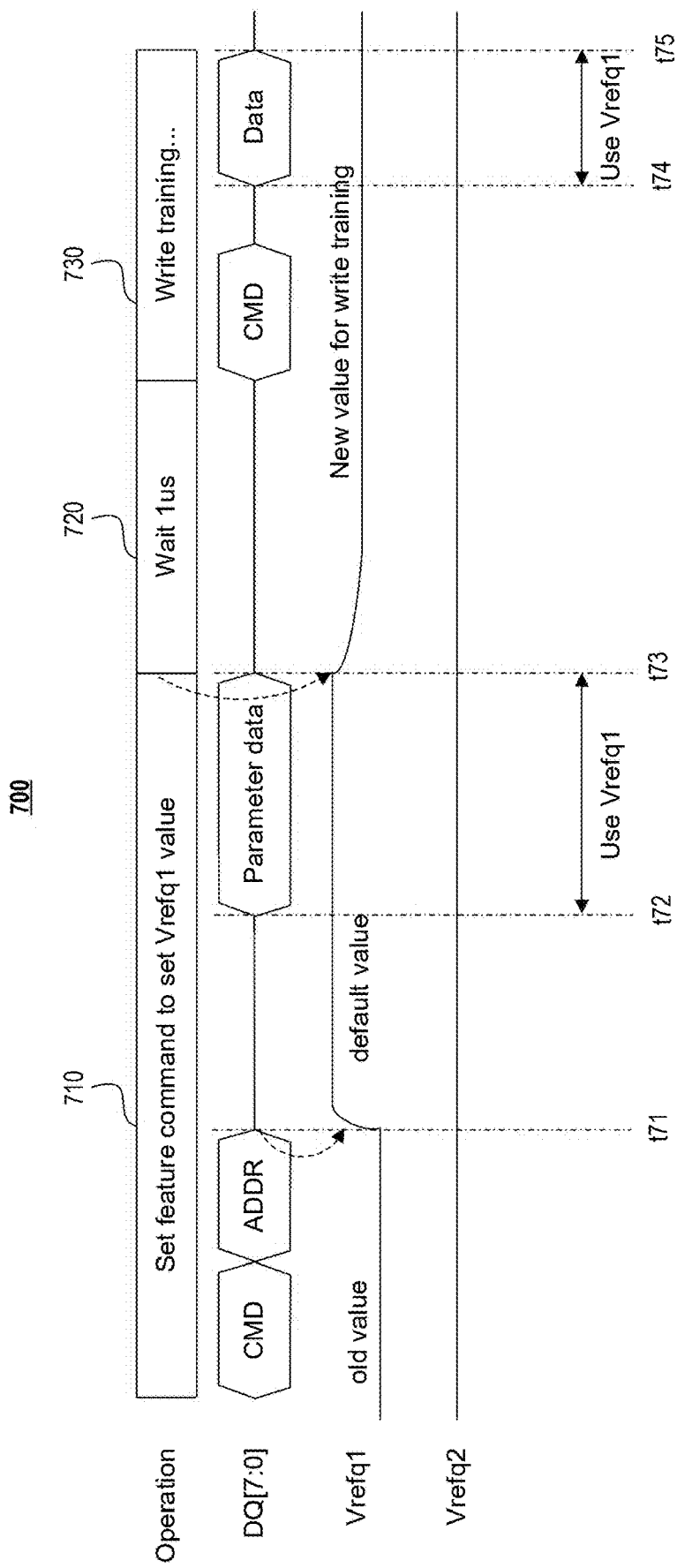
FIG. 7 illustrates a schematic timing diagram of exemplary operations of the method of FIG. 6 to train a first reference voltage, in accordance with some aspects of the present disclosure.

Referring to FIG. 7, a schematic timing diagram 700 of exemplary operations of method 600 of training first reference voltage Vrefq1 is illustrated, according to some aspects of the present disclosure. As shown in FIG. 7, during the first operation 710 of performing the set feature command to set Vrefq1 value, at time t71 right after the <CMD><ADDR> cycle, a default value can be set to Vrefq1 to replace the old value of the first reference voltage. During the period from time t72 to time t73, Vrefq1 with default value can be used during the <Parameter data> cycle. After operation 710, the first reference voltage Vrefq1 can be set to a new value in a waiting operation 720. In some aspects, the waiting operation 720 can last for any suitable time, such as any value from about 0.1 µs to about 2 µs (e.g., about 1 µs) until the first reference voltage Vrefq1 is stable at the new value. After waiting operation 720, the write training operation 730 can be performed. During the period from time t74 to time t75, Vrefq1 with the new value for write training can be used during the <Data> cycle of the write training. It is noted that, the value of the second reference voltage Vrefq2 can keep the same level during the entire process.

Figure 8A:
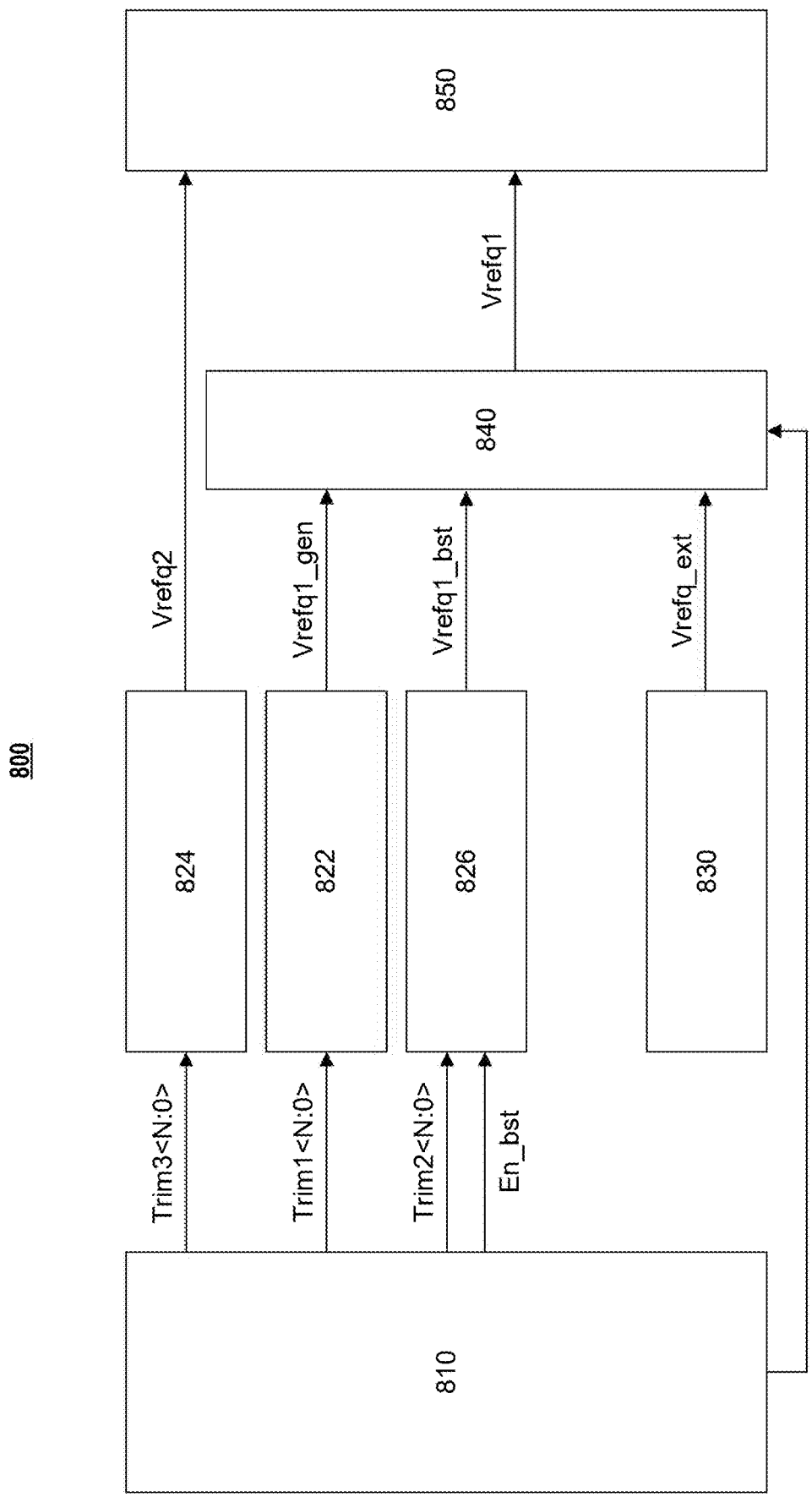
FIG. 8A illustrates a schematic block diagram of an exemplary peripheral circuit for IO reference voltage training of a NAND memory device, in accordance with some aspects of the present disclosure.

Referring to FIG. 8A, a schematic block diagram 800 of an exemplary peripheral circuit for IO reference voltage training of a NAND memory device is illustrated, according to some aspects of the present disclosure.

As shown in FIG. 8A, logic control circuit 810 can generate and transmit a first trimming voltage (e.g., Trim1<N:0>) to first main voltage source 822 to control the output voltage (e.g., a first reference voltage generation signal Vregq1_gen) of first main voltage source 822. Logic control circuit 810 can further generate and transmit a second trimming voltage (e.g., Trim2<N:0>) and booster enable control signal (e.g., En_bst) to control the output voltage (e.g., a first reference voltage boost signal Vrefq1_bst) voltage booster 826. A reference voltage pad 830 can generate a reference voltage extended signal (e.g., Vrefq_ext). Based on the received first reference voltage generation signal Vregq1_gen, first reference voltage boost signal Vrefq1_bst, reference voltage extended signal Vrefq_ext, and a control signal transmitted directly from logic control circuit 810, multiplexer 840 can output first reference voltage Vrefq1. Further, logic control circuit 810 can generate and transmit third trimming voltage (e.g., Trim3<N:0>) to second main voltage source 824 for generating second reference voltage Vrefq2. Both first reference voltage Vrefq1 and second reference voltage Vrefq2 can be transmitted to IO circuit 850 for use.

Figure 8B:
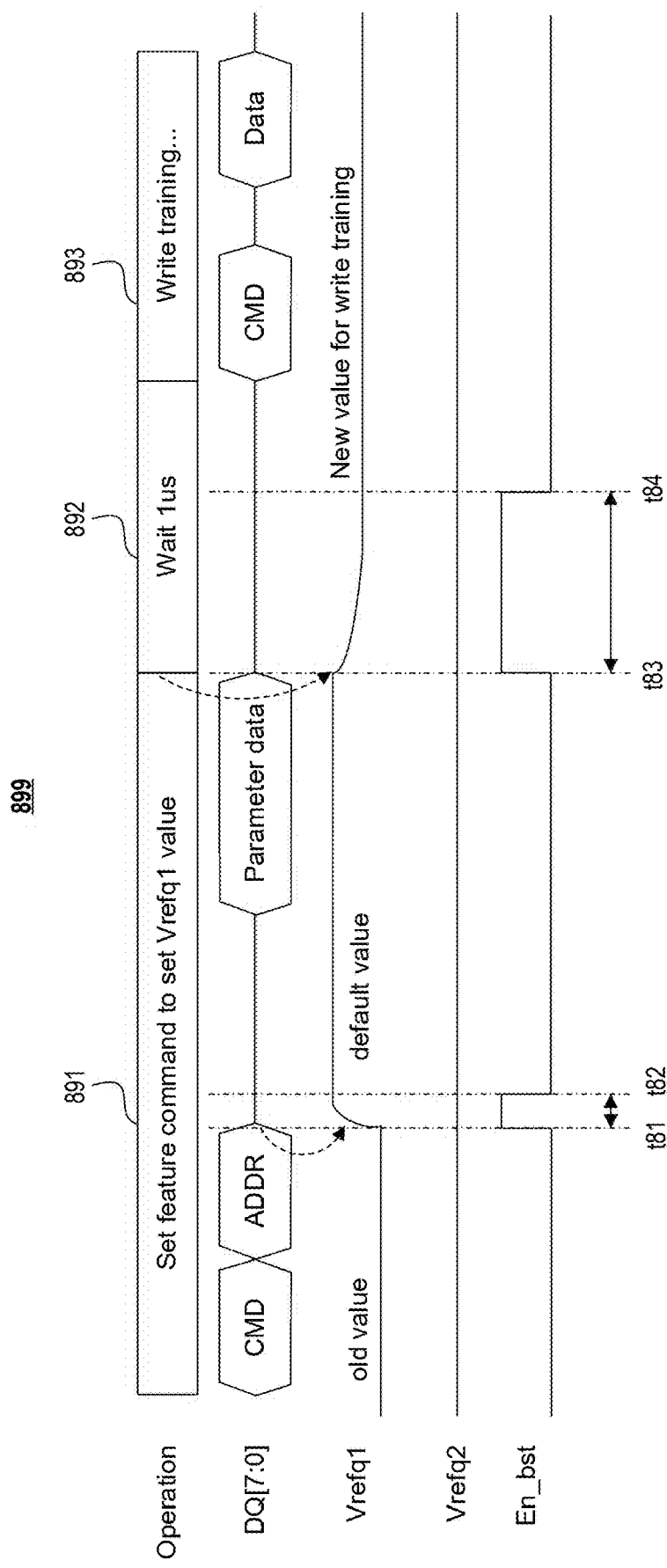
FIG. 8B illustrates a schematic timing diagram of exemplary operations of method of FIG. 6 to train the first reference voltage, in accordance with some aspects of the present disclosure of FIG. 8A.

Referring to FIG. 8B, a schematic timing diagram 899 of exemplary operations of method 600 to train first reference voltage Vrefq1 is illustrated, according to some aspects of the present disclosure based on FIG. 8A. Comparing schematic timing diagram 899 to schematic timing diagram 700 described above, a booster enable control signal En_bst can be used to control the first reference voltage boost signal Vrefq1_bst for speed up the stabilization of the new voltage level of first reference voltage Vrefq1 during the training process.

As shown in FIG. 8B, during the first operation 891 of performing the set feature command to set Vrefq1 value, at time t81 right after the <CMD><ADDR> cycle, a default value can be set to Vrefq1 to replace the old value of the first reference voltage. Booster enable control signal En_bst can be switched from low (e.g., "0" level) to high (e.g., "1" level) at time t81. Once the first reference voltage Vrefq1 is pumped up and maintained stably at the default value, the booster enable control signal En_bst can be switched from high to low at time t82. In some aspects, a time duration of the first high level booster enable control signal En_bst from time t81 to time t82 can be in a range from about 20 ns to about 100 ns, such as about 50 ns.

After operation 891, the first reference voltage Vrefq1 can be set to a new value in a waiting operation 892. At time t83 right after the <Parameter data> cycle, the new value for write training can be set to Vrefq1 to replace the default value of the first reference voltage. Booster enable control signal En_bst can be switched from low (e.g., "0" level) to high (e.g., "1" level) at time t83. Once the first reference voltage Vrefq1 is pumped down and maintained stably at the new value, the booster enable control signal En_bst can be switched from high to low at time t84. In some aspects, a time duration of the second high level booster enable control signal En_bst from time t83 to time t84 can be in a range from about 10 ns to about 800 ns, such as about 600 ns.

Figure 9A:
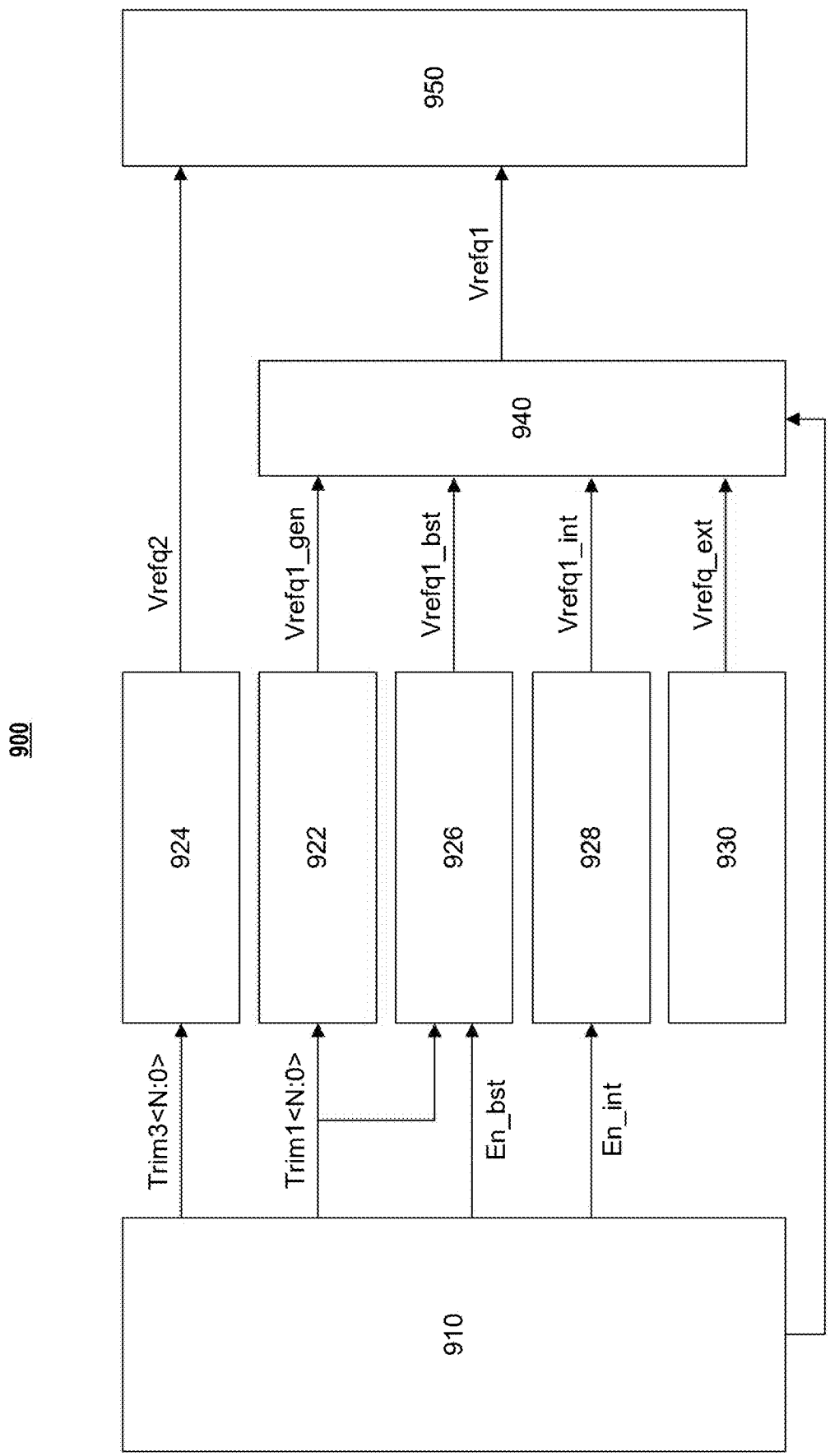
FIG. 9A illustrates a schematic block diagram of an exemplary peripheral circuit for IO reference voltage training of a NAND memory device, according to some other aspects of the present disclosure.

Referring to FIG. 9A, a schematic block diagram 900 of an exemplary peripheral circuit for IO reference voltage training of a NAND memory device is illustrated, according to some other aspects of the present disclosure.

As shown in FIG. 9A, logic control circuit 910 can generate and transmit a first trimming voltage (e.g., Trim1<N:0>) to first main voltage source 922 and to voltage booster 926 simultaneously. Logic control circuit 910 can further generate and transmit a booster enable control signal (e.g., En_bst) to voltage booster 926. Logic control circuit 910 can further generate and transmit an initiation enable control signal (e.g., En_int) to reference voltage initiating circuit 928. Based on the first reference voltage generation signal Vrefq1_gen outputted from first main voltage source 922, the first reference voltage boost signal Vrefq1_bst outputted from voltage booster 926, the first reference voltage initiation signal Vrefq1_int outputted from reference voltage initiating circuit 928, the reference voltage extended signal Vrefq_ext outputted from a reference voltage pad 930, and a control signal transmitted directly from logic control circuit 910, multiplexer 940 can output first reference voltage Vrefq1. Further, logic control circuit 910 can generate and transmit third trimming voltage (e.g., Trim3<N:0>) to second main voltage source 924 for generating second reference voltage Vrefq2. Both first reference voltage Vrefq1 and second reference voltage Vrefq2 can be transmitted to IO circuit 950 for use.

Figure 9B:
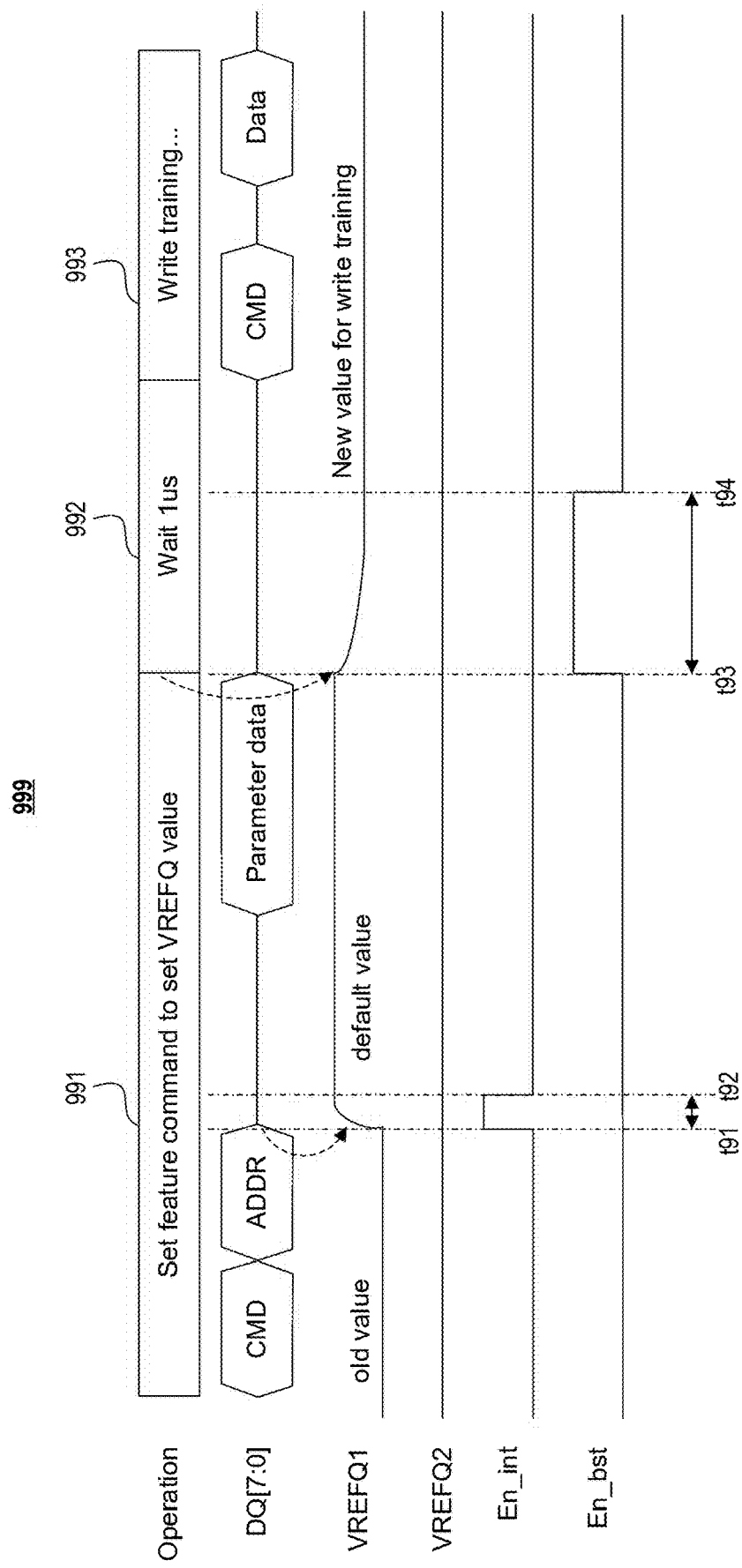
FIG. 9B illustrates a schematic timing diagram of exemplary operations of method of FIG. 6 to train the first reference voltage, in accordance with some aspects of the present disclosure of FIG. 9A.

Referring to FIG. 9B, a schematic timing diagram 999 of exemplary operations of method 600 to training first reference voltage Vrefq1 is illustrated, according to some other aspects of the present disclosure. Comparing schematic timing diagrams 999 to schematic timing diagrams 700 and 899 described above, an initiation enable control signal En_int can be used to control the reference voltage initiating circuit 928 for initiating the voltage level change of first reference voltage Vrefq1 during the training process.

As shown in FIG. 9, during the first operation 991 of performing the set feature command to set Vrefq1 value, at time t91 right after the <CMD><ADDR> cycle, a default value can be set to Vrefq1 to replace the old value of the first reference voltage. Initiation enable control signal En_int can be switched from low (e.g., "0" level) to high (e.g., "1" level) at time t91. Once the first reference voltage Vrefq1 is pumped up and maintained stably at the default value, the initiation enable control signal En_int can be switched from high to low at time t92. In some aspects, a time duration of the initiation enable control signal En_int from time t91 to time t92 can be in a range from about 20 ns to about 100 ns, such as about 50 ns.

After operation 991, the first reference voltage Vrefq1 can be set to a new value in a waiting operation 992. At time t93 right after the <Parameter data> cycle, the new value for write training can be set to Vrefq1 to replace the default value of the first reference voltage. Booster enable control signal En_bst can be switched from low (e.g., "0" level) to high (e.g., "1" level) at time t93. Once the first reference voltage Vrefq1 is pumped down and maintained stably at the new value, the booster enable control signal En_bst can be switched from high to low at time t94. In some aspects, a time duration of the high level booster enable control signal En_bst from time t93 to time t94 can be in a range from about 10 ns to about 800 ns, such as about 600 ns.

Referring to FIG. 10A, a schematic circuit diagram of an exemplary resistor divider 1000A is illustrated, according to some other aspects of the present disclosure. As shown, a plurality of resistors can be connected in a serious. A plurality of mutual connection points between pairs of adjacent resistors can be connected to a plurality of input lines of multiplexer 1040. Based on the received trimming voltage Trim<N:0>, multiplexer 1040 can output reference voltage Vrefq_out. It is noted that, the disclosed resistor divider 1000A can be used in any one of the first main voltage source, the second main voltage source, the voltage booster, and the reference voltage initiating circuit described above.

Referring to FIG. 10B, a schematic circuit diagram 1000B of an exemplary combination of a reference voltage generator and an analog buffer is illustrated, according to some other aspects of the present disclosure. As shown, reference voltage generator 1070 can generate reference voltage signal Vref as a first input of analog buffer 1080. The output Vrefq_out of analog buffer 1080 can be transmitted back to a second input of analog buffer 1080. It is noted that, the disclosed circuit 1000B can be used in any one of the first main voltage source, the second main voltage source, the voltage booster, and the reference voltage initiating circuit described above.

Figure 11:
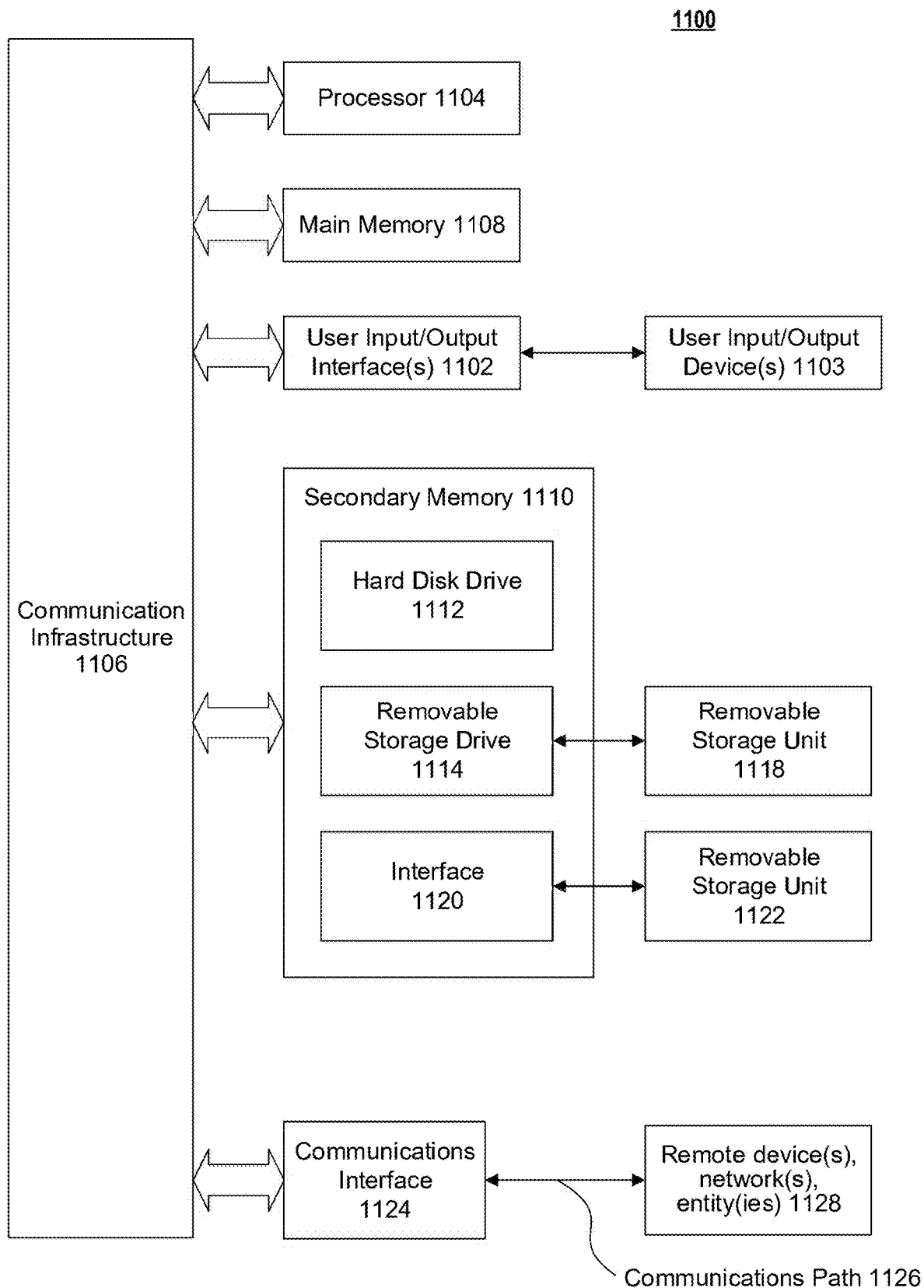
FIG. 11 illustrates a schematic block diagram of an exemplary computer system, in accordance with some aspects of the present disclosure.

Various disclosed aspects can be implemented, for example, using one or more computer systems, such as computer system 1100 shown in FIG. 11. Computer system 1100 can be any well-known computer capable of performing the functions described herein such as the memory system 102 of FIG. 1. Computer system 1100 includes one or more processors (also called central processing units, or CPUs), such as a processor 1104. Processor 1104 is connected to a communication infrastructure 1106 (e.g., a bus.) Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 can include one or more levels of cache. Main memory 1108 has stored therein control logic (e.g., computer software) and/or data.

Computer system 1100 can also include one or more secondary storage devices or memory 1110. Secondary memory 1110 can include, for example, a hard disk drive 1112 and/or a removable storage device or drive 1114. Removable storage drive 1114 can be a floppy disk drive, a magnetic tape drive, a compact disk drive, an optical storage device, tape backup device, and/or any other storage device/drive.

Removable storage drive 1114 can interact with a removable storage unit 1118. Removable storage unit 1118 includes a computer usable or readable storage device having stored thereon computer software (control logic) and/or data. Removable storage unit 1118 can be a floppy disk, magnetic tape, compact disk, DVD, optical storage disk, and/any other computer data storage device. Removable storage drive 1114 reads from and/or writes to removable storage unit 1118 in a well-known manner.

According to some aspects, secondary memory 1110 can include other means, instrumentalities or other approaches for allowing computer programs and/or other instructions and/or data to be accessed by computer system 1100. Such means, instrumentalities or other approaches can include, for example, a removable storage unit 1222 and an interface 1220. Examples of the removable storage unit 1222 and the interface 1220 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 can further include a communication or network interface 1224. Communication interface 1224 enables computer system 1100 to communicate and interact with any combination of remote devices, remote networks, remote entities, etc. (individually and collectively referenced by reference number 1228). For example, communication interface 1224 can allow computer system 1100 to communicate with remote devices 1228 over communications path 1226, which can be wired and/or wireless, and which can include any combination of LANs, WANs, the Internet, etc. Control logic and/or data can be transmitted to and from computer system 1100 via communication path 1226.

The operations in the preceding aspects can be implemented in a wide variety of configurations and architectures. Therefore, some or all of the operations in the preceding aspects can be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1222, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 11. In particular, aspects can operate with software, hardware, and/or operating system implementations other than those described herein.

Accordingly, the disclosed systems, methods, and media for input/output voltage training of a three-dimensional (3D) memory device can set reference voltage value without using additional ODT disable and enable commands, thus reducing operation time, avoiding complex design for non-target ODT case, and avoiding parameter data input error.

One aspect of the present disclosure provides a method for input/output voltage training of a three-dimensional (3D) memory device. The method can comprise the following operations: (1) setting a reference voltage value at an on-die termination (ODT) enabled status; (2) controlling the 3D memory device to perform a write training process; (3) determining whether a further write training process is needed; (4) in response to determining that the further write training process is needed, repeating operations (1), (2) and (3); and (5) in response to determining that the further write training process is not needed, setting the reference voltage value as an optimized reference voltage value.

It should be noted that the above operations (1)-(5) can be executed or performed in any order or sequence not limited to the order and sequence following the serial numbers which are merely used to distinguish different operations. Also, some of the operations (1)-(5) can be executed or performed substantially simultaneously where appropriate or in parallel to reduce latency and processing times. That is, one or more operations of (1)-(5) can be performed in a different order than represented, performed concurrently, or altogether omitted.

In some embodiments, setting the reference voltage value is performed no matter at the on-die termination (ODT) enabled status or at an ODT disabled status.

In some embodiments, setting the reference voltage value comprises controlling a main voltage source, by using a first trimming signal, to generate a reference voltage generation signal.

In some embodiments, setting the reference voltage value further comprises controlling a voltage booster, by using a second trimming signal and a booster enable control signal, to generate a reference voltage boost signal.

In some embodiments, setting the reference voltage value further comprises generating the reference voltage value based at least on the reference voltage generation signal and the reference voltage boost signal.

In some embodiments, wherein setting the reference voltage value further comprises: changing a reference voltage from an older value to a default value during a first time duration of a first high level of the booster enable control signal; and changing the reference voltage from the default value to a new value for write training during a second time duration of a second high level of the booster enable control signal.

In some embodiments, setting the reference voltage value further comprises: controlling a voltage booster, by using the first trimming signal and a booster enable control signal, to generate a reference voltage boost signal; and controlling a reference voltage initiating circuit, by using the first trimming signal and an initiation enable control signal, to generate a reference voltage initiation signal.

In some embodiments, setting the reference voltage value further comprises generating the reference voltage value based at least on the reference voltage generation signal, the reference voltage boost signal, and the reference voltage initiation signal.

In some embodiments, wherein setting the reference voltage value further comprises: changing the reference voltage from an older value to a default value during a first time duration of a high level of the initiation enable control signal; and changing the reference voltage from an older value to a default value during a first time duration of a high level of the booster enable control signal.

In some embodiments, performing the write training process comprises performing a data write-in operation and a data read-out operation; and determining whether the further write training process is needed at least based on a result of the data read-out operation.

Another aspect of the present disclosure provides a three-dimensional (3D) memory device, comprising an memory cell array and a peripheral circuit coupled with the memory cell array. The peripheral circuit comprises a control circuit configured to: (1) set a reference voltage value at an on-die termination (ODT) enabled status; (2) control the memory cell array to perform a write training process; (3) determine of whether a further write training process is needed; (4) in response to determining that the further write training process is needed, repeating operations (1), (2) and (3); and (5) in response to determining that the further write training process is not needed, setting the reference voltage value as an optimized reference voltage value.

In some embodiments, the logic control circuit is further configured to set the reference voltage value no matter at the on-die termination (ODT) enabled status or at an ODT disabled status.

In some embodiments, the peripheral circuit further comprises a main voltage source configured to receive a first trimming signal from the logic control circuit and to generate a reference voltage generation signal.

In some embodiments, the peripheral circuit further comprises a voltage booster configured to receive a second trimming signal and a booster enable control signal from the logic control circuit to generate a reference voltage boost signal.

In some embodiments, the peripheral circuit further comprises a multiplexer configured to generate the reference voltage value based at least on the reference voltage generation signal and the booster enable control signal.

In some embodiments, the multiplexer is configured to: change a reference voltage from an older value to a default value during a first time duration of a first high level of the booster enable control signal; and change the reference voltage from the default value to a new value for write training during a second time duration of a second high level of the booster enable control signal.

In some embodiments, the peripheral circuit further comprises: a voltage booster configured to receive the first trimming signal and a booster enable control signal from the logic control circuit to generate a booster enable control signal; and a reference voltage initiating circuit configured to receive the first trimming signal and an initiation enable control signal from the logic control circuit to generate a reference voltage initiation signal.

In some embodiments, the peripheral circuit further comprises a multiplexer configured to generate the reference voltage value based at least on the reference voltage generation signal, the booster enable control signal, and the reference voltage initiation signal.

In some embodiments, the multiplexer is further configured to: change the reference voltage from an older value to a default value during a first time duration of a high level of the initiation enable control signal; and change the reference voltage from an older value to a default value during a first time duration of a high level of the booster enable control signal.

In some embodiments, the control circuit is further configured to: control the memory cell array to perform a data write-in operation and a data read-out operation; and determine whether the further write training process is needed at least based on a result of the data read-out operation.

Another aspect of the present disclosure provides a memory system, comprising a 3D memory device described above, and a memory controller configure to control the 3D memory device.

The foregoing description of the specific aspects will so fully reveal the general nature of the present disclosure that others can, by applying knowledge within the skill of the art, readily modify and/or adapt, for various applications, such specific aspects, without undue experimentation, and without departing from the general concept of the present disclosure. Therefore, such adaptations and modifications are intended to be within the meaning and range of equivalents of the disclosed aspects, based on the disclosure and guidance presented herein. It is to be understood that the phraseology or terminology herein is for the purpose of description and not of limitation, such that the terminology or phraseology of the present specification is to be interpreted by the skilled artisan in light of the disclosure and guidance.

Aspects of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections can set forth one or more but not all exemplary aspects of the present disclosure as contemplated by the inventor(s), and thus, are not intended to limit the present disclosure and the appended claims in any way.

The breadth and scope of the present disclosure should not be limited by any of the above-described exemplary aspects, but should be defined only in accordance with the following claims and their equivalents.

What is claimed is:

1. A method for input/output voltage training of a three-dimensional (3D) memory device, comprising:
    (1) without providing a control signal to disable on-die termination, setting a reference voltage value at an on-die termination (ODT) enabled status;
    (2) controlling the 3D memory device to perform a write training process;
    (3) determining whether a further write training process is needed;
    (4) in response to determining that the further write training process is needed, repeating operations (1), (2) and (3); and
    (5) in response to determining that the further write training process is not needed, setting the reference voltage value as an optimized reference voltage value,
    wherein setting the reference voltage value comprises:
        controlling a main voltage source, by using a first trimming signal, to generate a reference voltage generation signal;
        controlling a voltage booster, by using a second trimming signal and a booster enable control signal, to generate a reference voltage boost signal;
        changing the reference voltage value from an older value to a default value during a first time duration of a first high level of the booster enable control signal by combining the reference voltage generation signal and the reference voltage boost signal, the default value greater than the older value; and
        changing the reference voltage value from the default value to a new value for write training during a second time duration of a second high level of the booster enable control signal, the new value lesser than the default value.

2. The method of claim 1, wherein setting the reference voltage value is performed without regard to the on-die termination (ODT) enabled status or an ODT disabled status.

3. The method of claim 1, wherein setting the reference voltage value further comprises:
controlling a voltage booster, by using the first trimming signal and a booster enable control signal, to generate a reference voltage boost signal; and
controlling a reference voltage initiating circuit, by using the first trimming signal and an initiation enable control signal, to generate a reference voltage initiation signal.

4. The method of claim 3, wherein setting the reference voltage value further comprises:
generating the reference voltage value based at least on the reference voltage generation signal, the reference voltage boost signal, and the reference voltage initiation signal.

5. The method of claim 3, wherein setting the reference voltage value further comprises:
changing the reference voltage value from an older value to a default value during a first time duration of a high level of the initiation enable control signal; and
changing the reference voltage value from an older value to a default value during a first time duration of a high level of the booster enable control signal.

6. The method of claim 1, wherein:
performing the write training process comprises performing a data write-in operation and a data read-out operation; and
determining whether the further write training process is needed at least based on a result of the data read-out operation.

7. A three-dimensional (3D) memory device, comprising:
a memory cell array;
a peripheral circuit coupled with the memory cell array, comprising:
a control circuit configured to:
(1) without providing a control signal to disable on-die termination, set a reference voltage value at an on-die termination (ODT) enabled status;
(2) control the memory cell array to perform a write training process;
(3) determine of whether a further write training process is needed;
(4) in response to determining that the further write training process is needed, repeat operations (1), (2) and (3); and
(5) in response to determining that the further write training process is not needed, set the reference voltage value as an optimized reference voltage value;
a main voltage source configured to receive a first trimming signal from the control circuit and to generate a reference voltage generation signal;
a voltage booster configured to receive a second trimming signal and a booster enable control signal from the control circuit to generate a reference voltage boost signal; and
a multiplexer configured to:
generate the reference voltage value based at least on the reference voltage generation signal and the booster enable control signal;
change the reference voltage value from an older value to a default value during a first time duration of a first high level of the booster enable control signal, the default value greater than the older value; and
change the reference voltage value from the default value to a new value for write training during a second time duration of a second high level of the booster enable control signal, the new value lesser than the default value.

8. The device of claim 7, wherein the control circuit is further configured to:
set the reference voltage value without regard to the on-die termination (ODT) enabled status or an ODT disabled status.

9. The device of claim 7, wherein the peripheral circuit further comprises:
a voltage booster configured to receive the first trimming signal and a booster enable control signal from the control circuit to generate a reference voltage boost signal;
a reference voltage initiating circuit configured to receive the first trimming signal and an initiation enable control signal from the control circuit to generate a reference voltage initiation signal; and
a multiplexer configured to generate the reference voltage value based at least on the reference voltage generation signal, the booster enable control signal, and the reference voltage initiation signal.

10. The device of claim 9, wherein the multiplexer is further configured to:
change the reference voltage value from an older value to a default value during a first time duration of a high level of the initiation enable control signal; and
change the reference voltage value from an older value to a default value during a first time duration of a high level of the booster enable control signal.

11. The 3D memory device of claim 7, wherein the control circuit is further configured to:
control the memory cell array to perform a data write-in operation and a data read-out operation; and
determine whether the further write training process is needed at least based on a result of the data read-out operation.

12. A memory system, comprising:
a three-dimensional (3D) memory device, comprising:
a memory cell array;
a peripheral circuit coupled with the memory cell array, comprising:
a control circuit configured to:
(1) without providing a control signal to disable on-die termination, set a reference voltage value at an on-die termination (ODT) enabled status;
(2) control the memory cell array to perform a write training process;
(3) determine of whether a further write training process is needed;
(4) in response to determining that the further write training process is needed, repeat operations (1), (2) and (3); and
(5) in response to determining that the further write training process is not needed, set the reference voltage value as an optimized reference voltage value;
a main voltage source configured to receive a first trimming signal from the control circuit and to generate a reference voltage generation signal;
a voltage booster configured to receive a second trimming signal and a booster enable control signal from the control circuit to generate a reference voltage boost signal; and a multiplexer configured to:
- generate the reference voltage value based at least on the reference voltage generation signal and the booster enable control signal;
- change the reference voltage value from an older value to a default value during a first time duration of a first high level of the booster enable control signal, the default value greater than the older value; and
- change the reference voltage value from the default value to a new value for write training during a second time duration of a second high level of the booster enable control signal, the new value lesser than the default value; and a memory controller configure to control the 3D memory device.

13. The method of claim 1, wherein the second time duration is subsequent to the first time duration.

14. The method of claim 1, further comprising receiving, at a circuit directly coupled to the reference voltage generation signal and the voltage booster, the reference voltage generation signal and the reference voltage boost signal.

15. The 3D memory device of claim 7, wherein the multiplexer is directly coupled to the main voltage source and the voltage boost.

16. The memory system of claim 12, wherein the multiplexer is directly coupled to the main voltage source and the voltage boost.

* * * * *

UNITED STATES PATENT AND TRADEMARK OFFICE
CERTIFICATE OF CORRECTION

| | | |
|---|---|---|
| PATENT NO. | : 12,469,551 B2 | Page 1 of 1 |
| APPLICATION NO. | : 17/929450 | |
| DATED | : November 11, 2025 | |
| INVENTOR(S) | : Shiyang Yang et al. | |

It is certified that error appears in the above-identified patent and that said Letters Patent is hereby corrected as shown below:

In the Claims

Claim 8, Column 22, Line 6: "The device of claim 7, wherein the control circuit is" should read --The 3D memory device of claim 7, wherein the control circuit is--.

Claim 9, Column 22, Line 11: "The device of claim 7, wherein the peripheral circuit" should read --The 3D memory device of claim 7, wherein the peripheral circuit--.

Claim 10, Column 22, Line 25: "The device of claim 9, wherein the multiplexer is" should read --The 3D memory device of claim 9, wherein the multiplexer is--.

Signed and Sealed this
Tenth Day of February, 2026

John A. Squires
*Director of the United States Patent and Trademark Office*